(12) United States Patent
Carre et al.

(10) Patent No.: US 7,198,768 B2
(45) Date of Patent: Apr. 3, 2007

(54) ANTI-DEGRADATION MECHANISMS FOR PROTECTING AMINATED SURFACES

(75) Inventors: Alain R. E. Carre, Le Chatelet-en-Brie (FR); Valerie Lacarriere, Larchant (FR)

(73) Assignee: Corning Incorporated, Corning, NY (US)

( * ) Notice: Subject to any disclaimer, the term of this patent is extended or adjusted under 35 U.S.C. 154(b) by 393 days.

(21) Appl. No.: 10/963,926

(22) Filed: Oct. 12, 2004

(65) Prior Publication Data

US 2005/0281723 A1 Dec. 22, 2005

(30) Foreign Application Priority Data

Jun. 16, 2004 (EP) .................. 04291513

(51) Int. Cl.
B65D 81/26 (2006.01)
B01D 53/62 (2006.01)

(52) U.S. Cl. ........................ 423/220; 423/230
(58) Field of Classification Search .................. 95/139; 423/220, 230; 206/7, 454, 456
See application file for complete search history.

(56) References Cited

U.S. PATENT DOCUMENTS

| 4,681,218 A | 7/1987 | Williams ............... 206/204 |
| 4,810,266 A * | 3/1989 | Zinnen et al. ............ 95/139 |
| 6,194,079 B1 | 2/2001 | Hekal .................... 428/566 |
| 6,364,938 B1 * | 4/2002 | Birbara et al. ............ 95/139 |
| 2004/0031712 A1 | 2/2004 | Maxim et al. ............ 206/456 |
| 2004/0099559 A1 | 5/2004 | Schnabel et al. .......... 206/454 |

FOREIGN PATENT DOCUMENTS

WO  WO03/013843  2/2003

OTHER PUBLICATIONS

H.Y. Huang et al., "Amine-grafted MCM-48 and Silica Xerogel as Superior Sorbents for Acidic Gas Removal from Natural Gas", Indus. Eng. Chem. Res., pp. 2427-2433.
D.V. Danckwerts et al., The Absorption of Carbon Dioxide into Solutions of Alkalis and Amines (With Some Notes on Hydrogen Sulphide and Carbonyl Sulphide), Review Series No. 2, The Chemical Engineer, Oct. 1966, p. 244-280.

* cited by examiner

Primary Examiner—Frank M. Lawrence
(74) Attorney, Agent, or Firm—Thomas R. Beall; Vincent T. Kung

(57) ABSTRACT

A device and methods for either protecting or restoring the delicate surface chemistry of amine-coated substrates adapted for biological assay uses from the deleterious effects of exposure to carbon dioxide and/or organic chemical compounds, which may arise in packaging or storage containers is provided. The device encompasses an enclosure, preferably hermetically sealed, a component susceptible to degradation from either carbon dioxide or organic compounds, and a sorbent, having a composition made from either a single material or a combination of materials, said material is characterized as being reactive with $CO_2$ and having a high-surface energy of $\geq 100$ milli-joules/$m^2$ for removing organic compounds. The method can stabilize the surface chemistry and prolong the useful life of the coated substrate.

18 Claims, 16 Drawing Sheets

FIG. 3
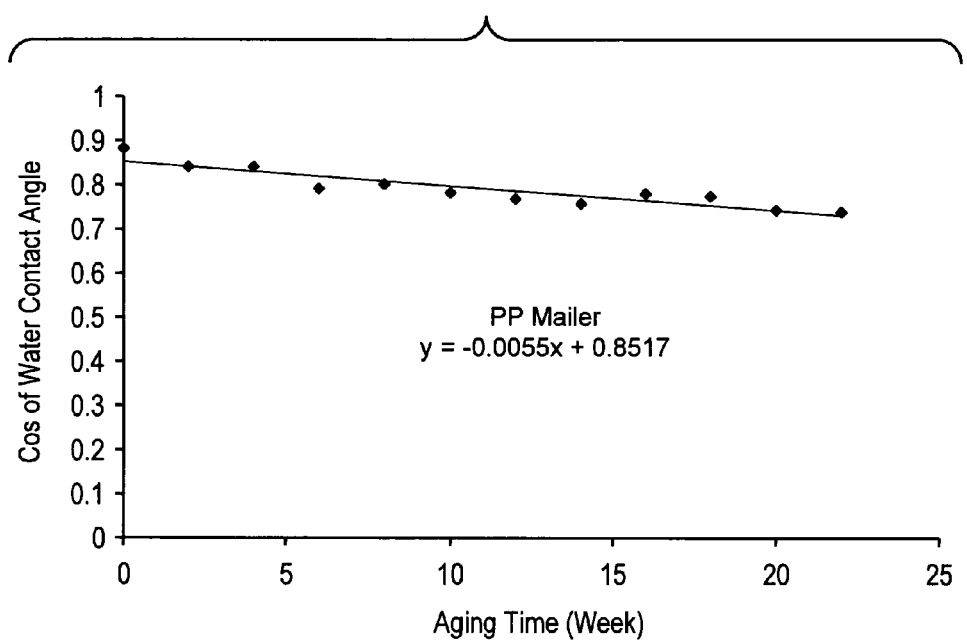
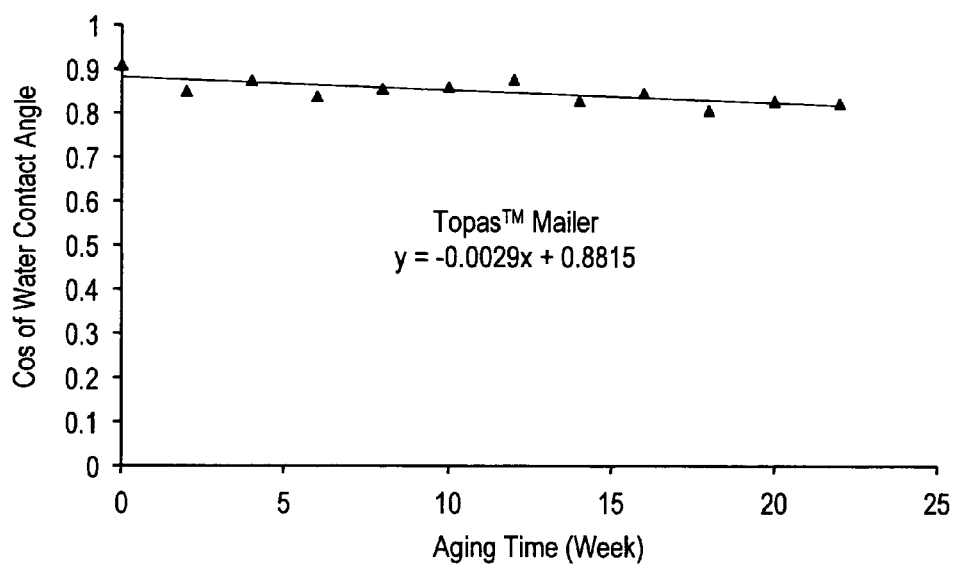

FIG. 12

| 1 Month Storage | | | 2 Month Storage | | | 3 Month Storage | | |
|---|---|---|---|---|---|---|---|---|
| Fresh GAPS Slide | Storage With CaO Powder in Evergreen™ Container | Storage Without CaO Powder in Evergreen™ Container | Fresh GAPS Slide | Storage With CaO Powder in Evergreen™ Container | Storage Without CaO Powder in Evergreen™ Container | Fresh GAPS Slide | Storage With CaO Powder in Evergreen™ Container | Storage Without CaO Powder in Evergreen™ Container |
| Mean θ / Water: 41° | Mean θ / Water: 41° | Mean θ / Water: 48° | Mean θ / Water: 43° | Mean θ / Water: 40° | Mean θ / Water: 44° | Mean θ / Water: 43° | Mean θ / Water: 32° | Mean θ / Water: 53° |
| Cy3: 32 Cy5: 29 | Cy3: 33 Cy5: 29 | Cy3: 34 Cy5: 29 | Cy3: 33 Cy5: 28 | Cy3: 32 Cy5: 29 | Cy3: 32 Cy5: 29 | Cy3: 31 Cy5: 29 | Cy3: 32 Cy5: 29 | Cy3: 32 Cy5: 29 |
| 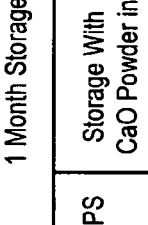 | 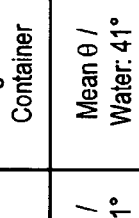 | | 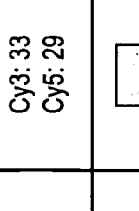 | 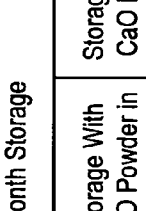 | | 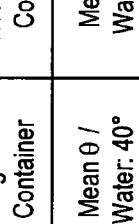 | 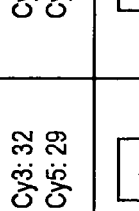 | |

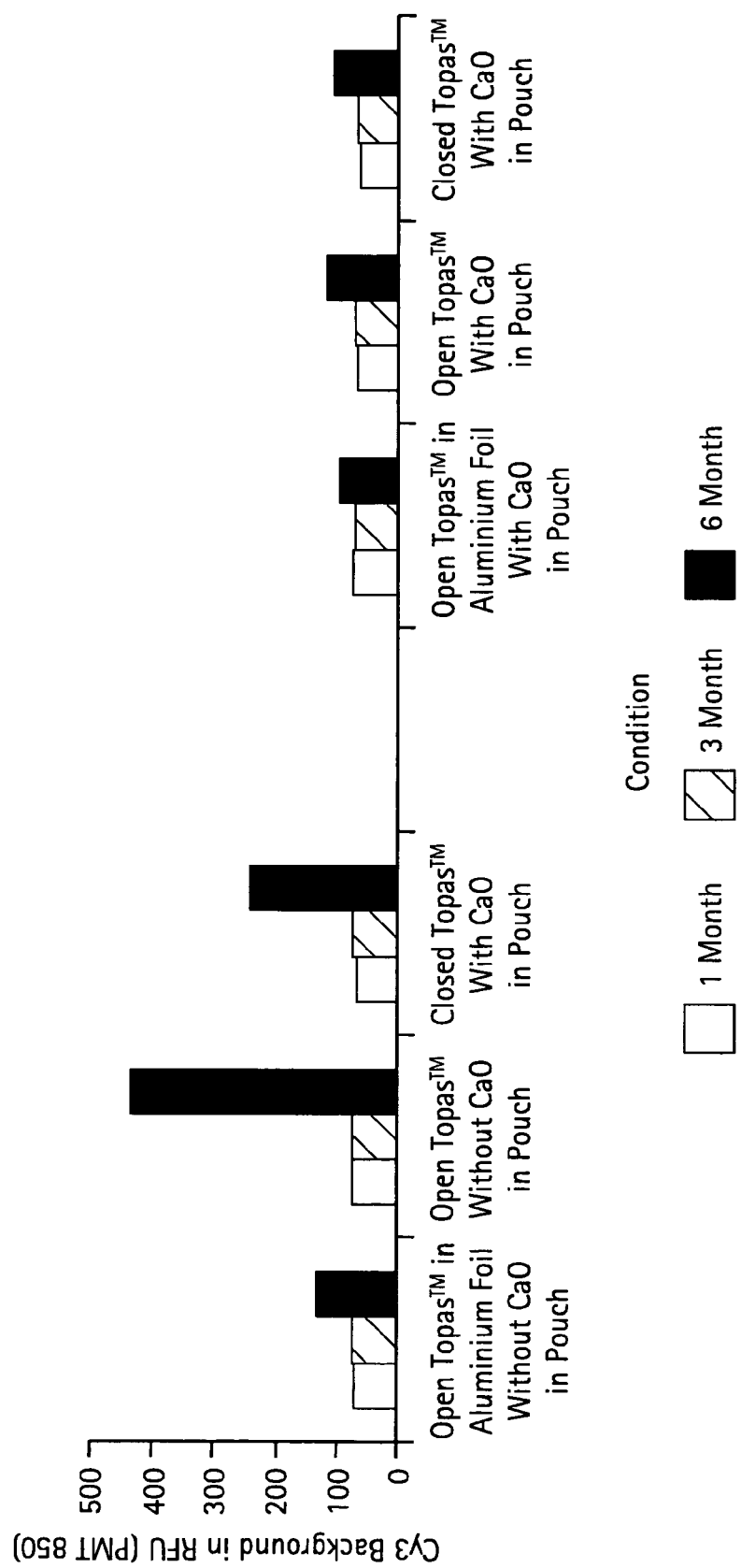

ANTI-DEGRADATION MECHANISMS FOR PROTECTING AMINATED SURFACES

CLAIM OF PRIORITY

This application claims the priority benefit of European Application number 04291513.2, filed Jun. 16, 2004.

FIELD OF INVENTION

The present invention relates the use of particular sorbent or getter materials in methods or means for protecting amine-coated substrate surfaces from degradation when such surfaces come in contact with certain contaminants or component species.

BACKGROUND

In recent years, the biological, clinical, pharmaceutical, and other research communities have recognized that microarrays are useful, high-throughput research tools to measure a variety of biological or biochemical interactions and functions. For instance, microarrays on slides or in other formats can conserve limited or costly reagents or materials for biological or biochemical analyses. With widespread acceptance, the microarray format is likely to remain a key research tool into the foreseeable future. Applications for microarray technology will continue to expand in the areas of drug discovery and development, chemical detection, diagnostics, and basic research.

The surface chemistry and the surface morphology of the microarray substrate are important factors, which impact the quality of data derived from assays using microarray readings. In the fabrication of microarrays, the surfaces of both organic and inorganic substrates are typically modified by the deposition of a coating or a polymeric film to promote adhesion and improve immobilization or attachment of biomolecules. Substrates with poor quality surface chemistry often result in low binding efficiency, poor spot morphology, and unacceptably high residual background signal that can be non-uniform.

In the preparation of microarrays, the creation of a stable surface chemistry on inorganic substrates, such as glass slides or other silica-based surfaces, which can support a variety of biological species, is one among several important factors. For instance, the preparation of membrane protein arrays is particularly challenging because difficulties associated with preserving the correct structure-folded conformation of proteins in an immobilized state. Membrane proteins, such as G-protein coupled receptors (GPCR) maintain their folded conformations when associated with a lipid bilayer membrane. The structure and properties of lipid molecules and membrane receptor-associated lipids immobilized on a solid surface strongly depend on the chemical nature of the surface. Silanization, the application of an aminosilane to glass substrates, creates an amine-rich surface that is ideal for attaching biological membranes, membrane proteins, or proteins, as well as nucleic acid molecules (e.g., DNA or oligonucleotides) to the substrate surface.

If not handled properly during the fabrication process or, afterwards, during storage or transport, microarray substrates are susceptible to damage and degradation of the surface chemistry. Several molecular processes, may impact the functionality and quality of amine-coated surfaces. In particular, exposure to atmospheric carbon dioxide, for instance, can modify the surface chemistry and wettability characteristics of amine-coated slides.

The reactions between carbon dioxide and amines have been studied (P. V. Danckwerts, and M. M. Sharma, *The Chemical Engineer*, October 1966, pp. 244–280). Carbon dioxide reacts with primary or secondary amines to form carbamate or bicarbonate, respectively, in dry or humid conditions. (See, H. Y. Huang et al., "Amine-grafted MCM-48 and Silica Xerogel as Superior Sorbents for Acidic Gas Removal from Natural Gas," *Indus. Eng. Chem. Res.*, 47, 2427–2433 (2003)). The reaction is the following:

$$2RNH_2 + CO_2 \rightarrow RNHCOO^- RNH_3^+ \qquad [1].$$

It is a second-order reaction. The kinetics of the reaction is given by:

$$\frac{d[Am]}{dt} = k_{am}[Am] \cdot [CO_2], \qquad [2]$$

where [Am] represents the concentration of free amines, [$CO_2$] the carbon dioxide concentration, $k_{am}$ is the rate constant and t the time. The formation of the carbamate is believed to occur in two steps, the rate-determining step is the insertion of $CO_2$ into N—H bond which probably involves the reversible formation of a Lewis acid-base adduct followed by the very rapid protonation of another amine molecule.

Alternatively, interactions between the coated substrate surface and organic molecules can also detrimentally affect the performance and quality of the substrates. Conventional materials are inadequate to prevent such degradation of the surface chemistry. Conventional containers used to store microarray substrates are made typically from so-called commodity resins, such as high-density poly-ethylene, poly-propylene, poly-styrene, acrylonitrile butadiene styrene (ABS). In U.S. Patent Publication No. 2004-0031712 A1, incorporated herein by reference, Maxim et al. discuss the interaction of these conventional, non-specialty-engineered materials with the coated surface of a glass substrate, which changes the nature of the surface. Maxim et al. believed that containers made from these kinds of polymer materials out-gas certain components or units, such as monomers, stabilizers or binders, effect the surface of coated slides. That is, these components interfere with the performance of the substrate by changing the desired parameters or engineered specifications of the substrate surface. As a result, background fluorescence and the hydrophobic nature of the substrate surface increases, as indicated by increased contact or wetting angles.

Since surface properties can materially impact the quality and level of performance of an assay conducted using the microarray, maintaining a stable surface chemistry on amine-coated substrates is important. Hence, we recognize that a need exists for either new materials or materials having properties that will allow one to store microarray substrates without having them become degraded or damaged over time. To minimize these problems and/or protect the surface chemistry, the substrates require a sorbent, and packaging device that incorporates the sorbent material, which can removal trace amounts of $CO_2$ as well as capture free organic components from within the packaging.

SUMMARY OF THE INVENTION

According to one aspect, the present invention pertains to the use of sorbent materials. More particularly, the invention describes certain mechanisms or means of protecting the chemical or functional properties of an amine-coated substrate surface from degradation resulting from premature aging caused by exposure to carbon dioxide, other gases, and/or organic compounds in air. A method of the invention, in its simplest iteration, comprises the steps of: providing a container for holding or housing an amine-coated substrate: providing a sorbent, having a composition made from either a single material or a combination of materials; placing the sorbent in the container; and exposing said amine-coated substrate to said sorbent in said container. The sorbent material is characterized as being reactive with $CO_2$ and having a high-surface energy of $\geq 100$ milli-joules/m$^2$ for removing organic compounds from within the container. Preferably, the sorbent material includes any one or combination of: CaO, MgO, and ZnO. The sorbent material preferably has a high capacity for absorbing $CO_2$ and can prevent or retard carbonatation, which detrimentally affects the surface properties of amine-coated glass substrates, such as used for biological slide preparations. The presence of the sorbent can also reduce or eliminate high auto-fluorescence on the substrate surface, which results from reaction between the amine-coating and organic components that typically outgas from plastic storage containers. Further, the method of the present invention, comprises maintaining a water contact angle $\theta$ of about 50 degrees, preferably $\leq 40$ degrees, relative to the amine-coated substrate surface to preserve hydrophilicity of the substrate surface.

According to another variation, the present invention describes a method for removing $CO_2$ or organic contaminants from a package containing an amine-coated substrate. The method comprises: providing a carbonated substrate and either a sorbent material that is reactive with $CO_2$ and having a high-surface energy on the order of about 100 milli-joules/m$^2$ or greater for removing organic compounds, or a solution of hydroxide, preferably of either calcium, magnesium, or zinc, $Ca(OH)_2$, $Mg(OH)_2$, $Zn(OH)_2$, with a pH value $\geq 8$, or a combination of the hydroxides; exposing a surface of said carbonated substrate to either said sorbent material or said hydroxide solution, or both, wherein either the solid sorbent or the alkaline solution regenerates free amine functionality on the surface. According to the method, the carbonated substrate surface is exposed to the solution of either $Ca(OH)_2$, $Mg(OH)_2$, or $Zn(OH)_2$, or the combination thereof for a period of within one hour, preferably for under about forty (40) minutes, but not less than about ten (10) minutes. Preferably, the amine-coated substrate surface is dipped into the calcium hydroxide solution.

According to another aspect, the present invention encompasses an object or device comprising an enclosure, a component susceptible to degradation from either carbon dioxide or organic compounds, and a sorbent, such as in the foregoing, having a composition made from either a single-material or a combination of materials, said material is characterized as being reactive with $CO_2$ and having a high-surface energy on the order of about 100 milli-joules/m$^2$ or greater for removing organic compounds from within said enclosure. The enclosure comprises any kind of containment or housing adapted to hold an amine-coated inorganic substrate. The sorbent can be place within, for instance, a filter bag or any kind of receptacle that permits air to flow through and remove trace amounts of carbon dioxide and organic compounds from within the container device. In closed systems, such as in hermetic packages, the sorbent material is adapted to absorb residue $CO_2$ to virtual completion at levels below 1 part per billion (ppb), preferably below 1 part per trillion (ppt), over a wide temperature range from about $-40°$ C., through ambient room temperature ($\sim 20°$ C.), to about $500°$ C. It is envisioned, however, that packaging containing sorbent materials and amine-coated substrates will normally be stored or used under conditions at or near room temperature.

In another embodiment of the device, a hermetically sealed transport and storage package is provided. The package comprises: a sealed enclosure in which there is an atmosphere and a component adapted for performing a biological or biochemical assay, said component characterized as being adversely affected by the presence of gaseous $CO_2$, organic or other impurities in said atmosphere; and a chemisorbent material having a composition made from either a single-material or a combination of materials, said material being reactive with $CO_2$ and having a high-surface energy on the order of about 100 milli-joules/m$^2$ or greater for removing organic compounds from within said enclosure According to yet another embodiment, the invention also includes a device or assembly, which incorporates or embodies the method, for the transport or storage of such substrates. In general, the device may take the form of a container box, package, sleeve, or pouch made for housing or holding at least one amine-coated substrate, preferably a plurality of substrates together. The packages or containers should not degrade the ability of biomolecules to bind or attach to the surface of substrates, such as slides, and methods for using such containers. Coatings on glass substrates that are required for the printing of microarrays are very active and susceptible to contamination caused by out-gassing of materials. We have found that typical, so-called "off-the-shelf" slide packaging, contaminates the substrate coating over time resulting in poor microarray quality. This problem is not limited only to just specific products, but can be found as well in most likewise polymer or plastic packaging products. Although coated substrates can be stored in stable, non-out-gassing materials, such as glass or metal, these materials are not suitable due to breakage of either the slide or the container during shipping and handling.

Additional features and advantages of the present invention will be revealed in the following detailed description. Both the foregoing summary and the following detailed description and examples are merely representative of the invention, and intended to provide an overview for understanding the invention as claimed. Reference to the accompanying figures and the detailed description may convey a better understanding of the present invention.

BRIEF DESCRIPTION OF FIGURES

FIG. 3 shows the variation of the cosine of the water contact angle with aging time (a decrease of the cosine correspond to an increase of the angle).

WALLIPHOS TRP 40: $i$-$C_{13}$-Alcoholpolyglycol-etherphosphoric acid ester;

WALLIPHOS NOP 60: Nonylphenolpolyglycol-etherphosphoric acid ester; SDS: Sodium Dodecylsulfate.)

Figure 8:
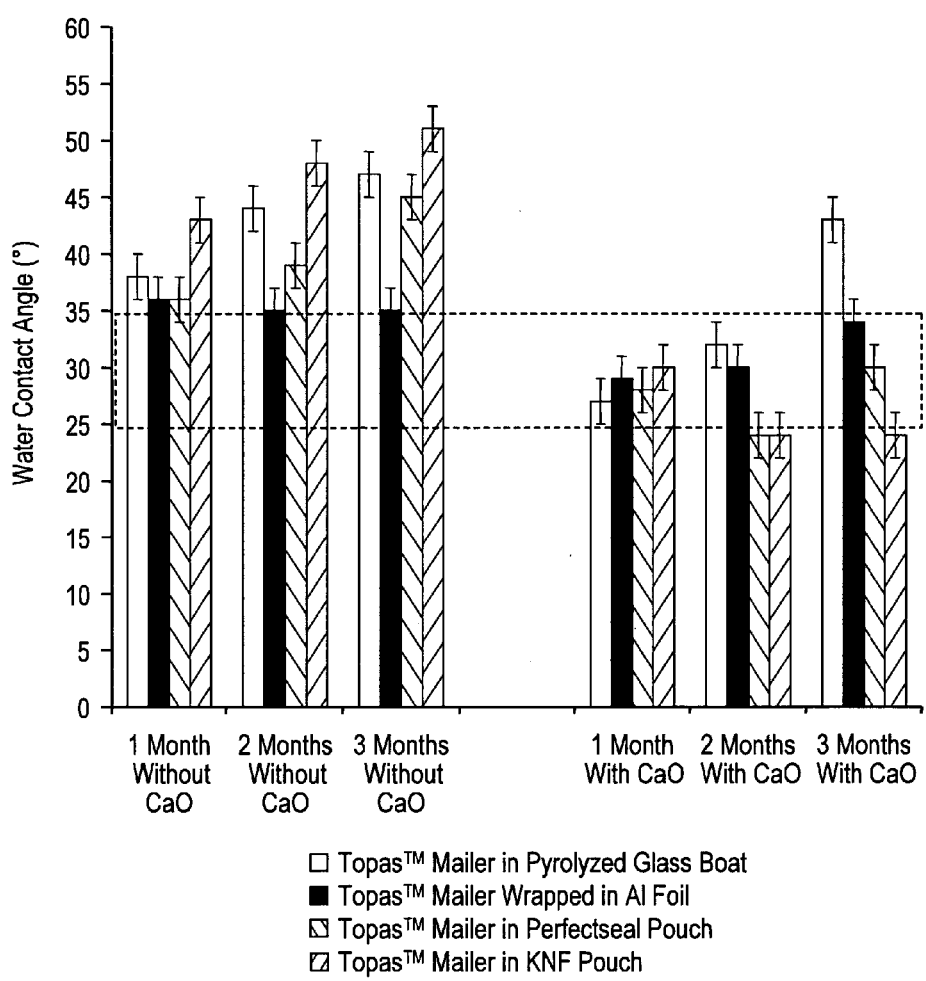

FIG. 8 shows the water contact angle after 1, 2, and 3 months, respectively, of storage in different packaging containers either with or without CaO present.

Figure 9:
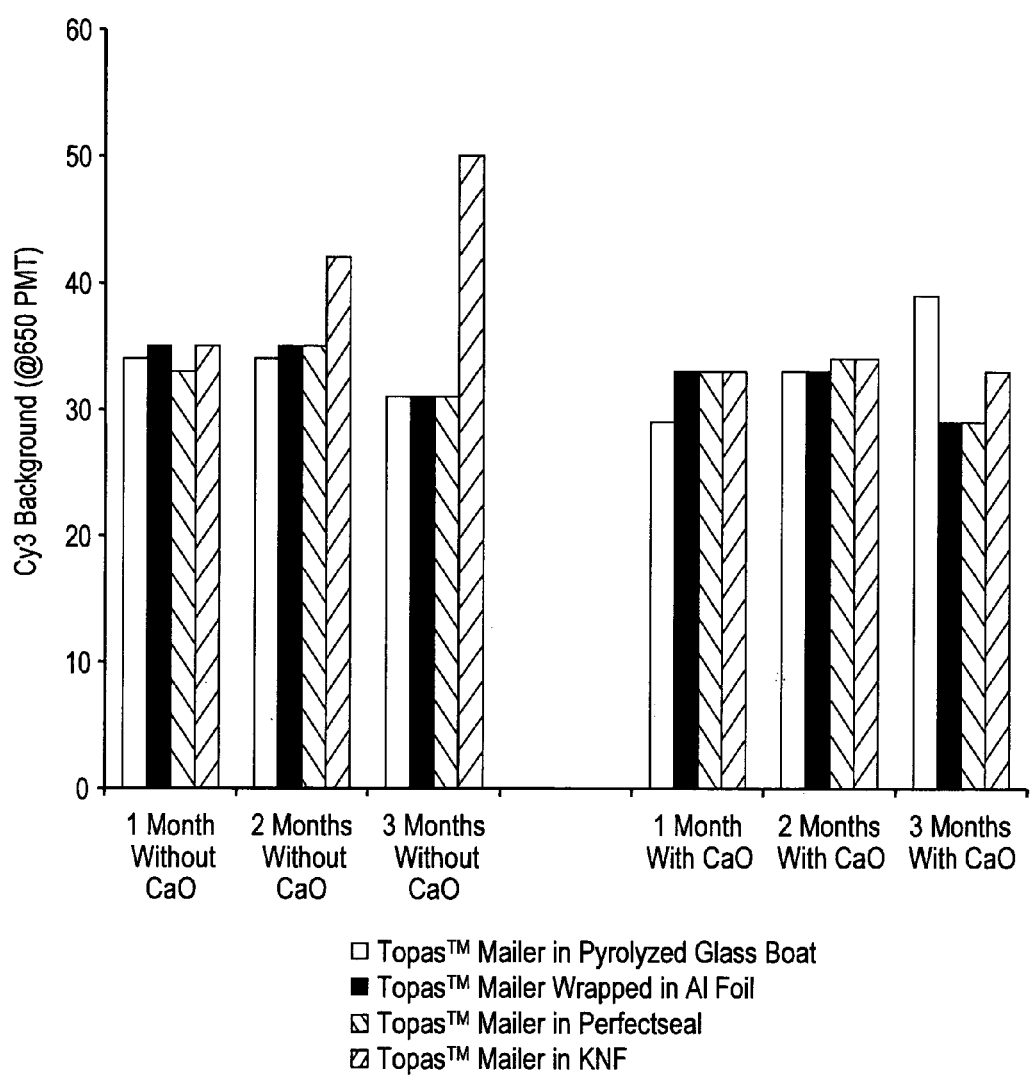
Figure 10:
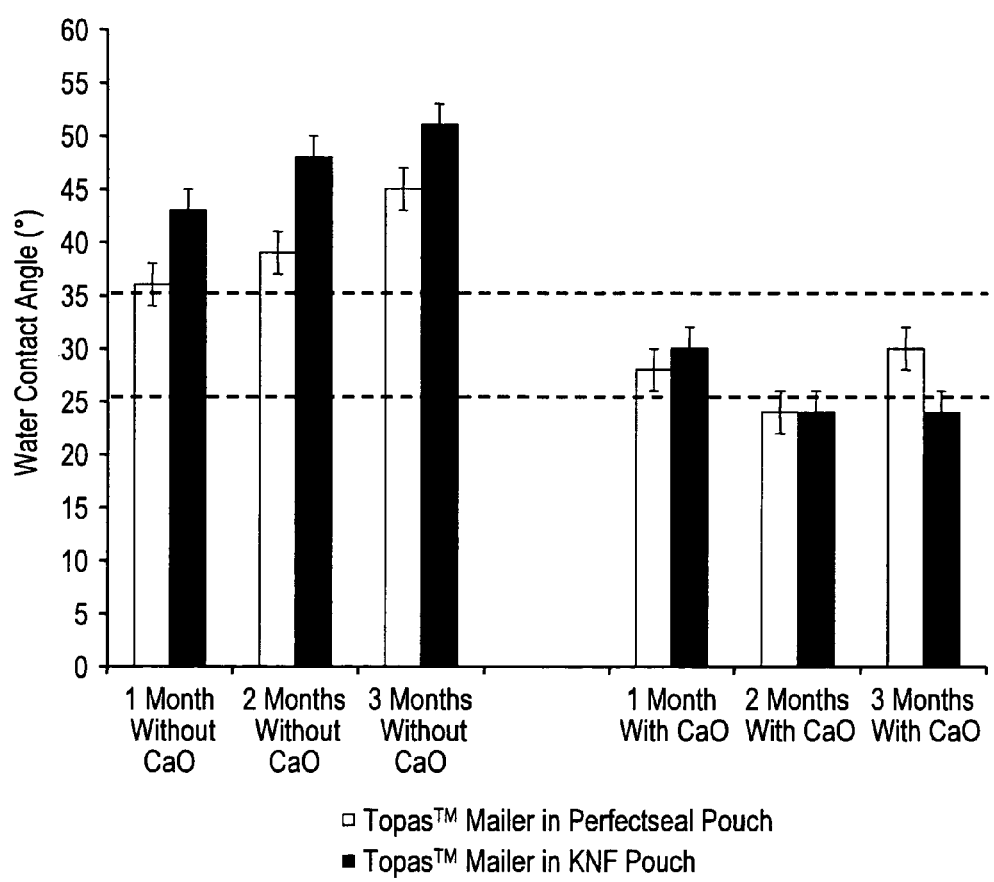
Figure 11:
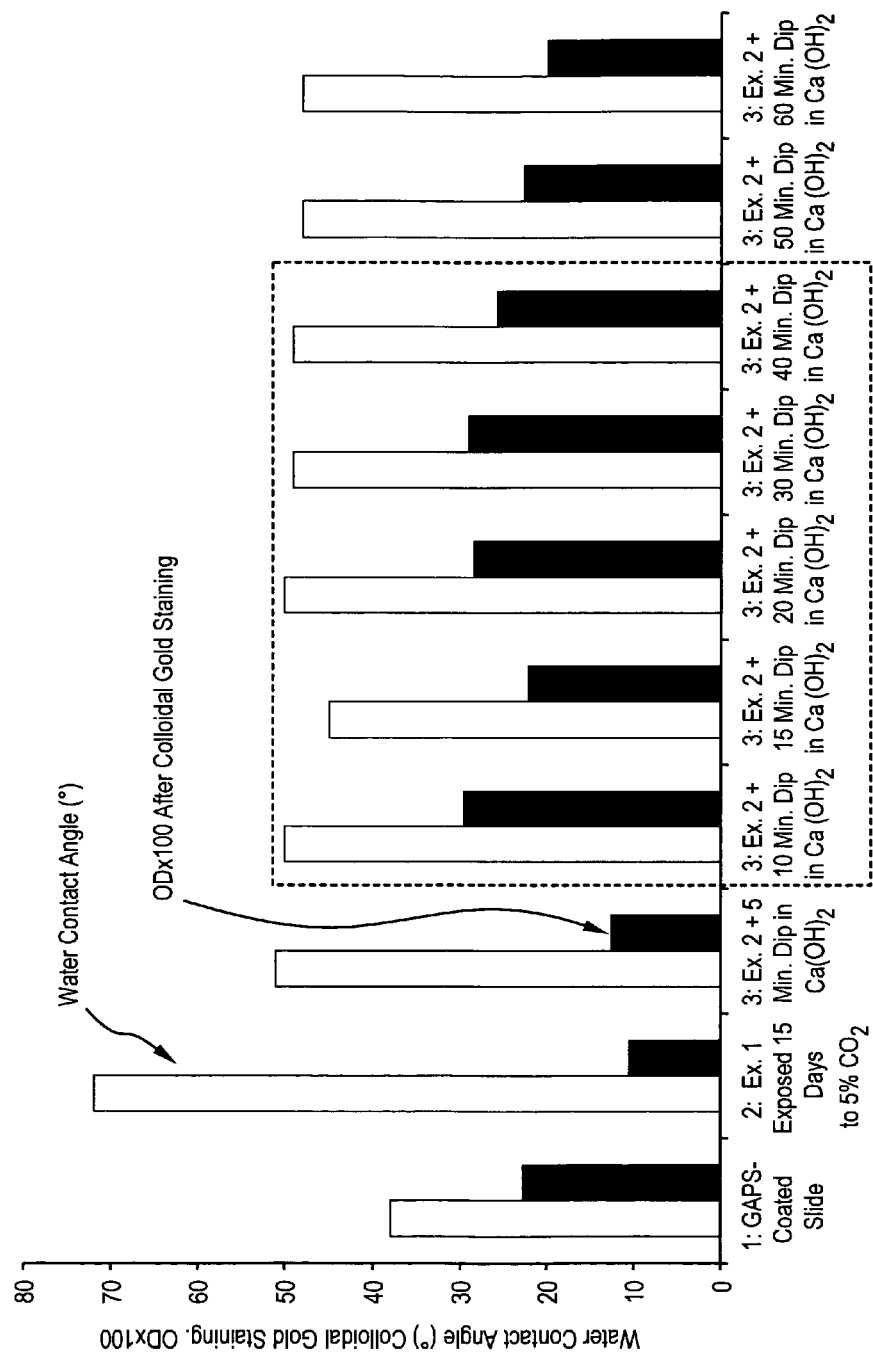

FIG. 9 Cy3 background (auto-fluorescence) after 1, 2 and 3 months of storage with and without CaO in different packaging FIG. 10 Water contact angle after 1, 2 and 3 months of storage with and without CaO in hermetic packaging FIG. 11 presents the regeneration of carbonated GAPS coated slides in a calcium carbonate solution FIG. 12 presents empirical results for a number of amine-coated substrate surfaces with and without treatment with $CO_2$-sorbent present in a container, and the comparative aging and surface chemistry degradation in terms of mean water contact angles θ. The substrate samples were monitored each month over a three month period.

Figure 13:
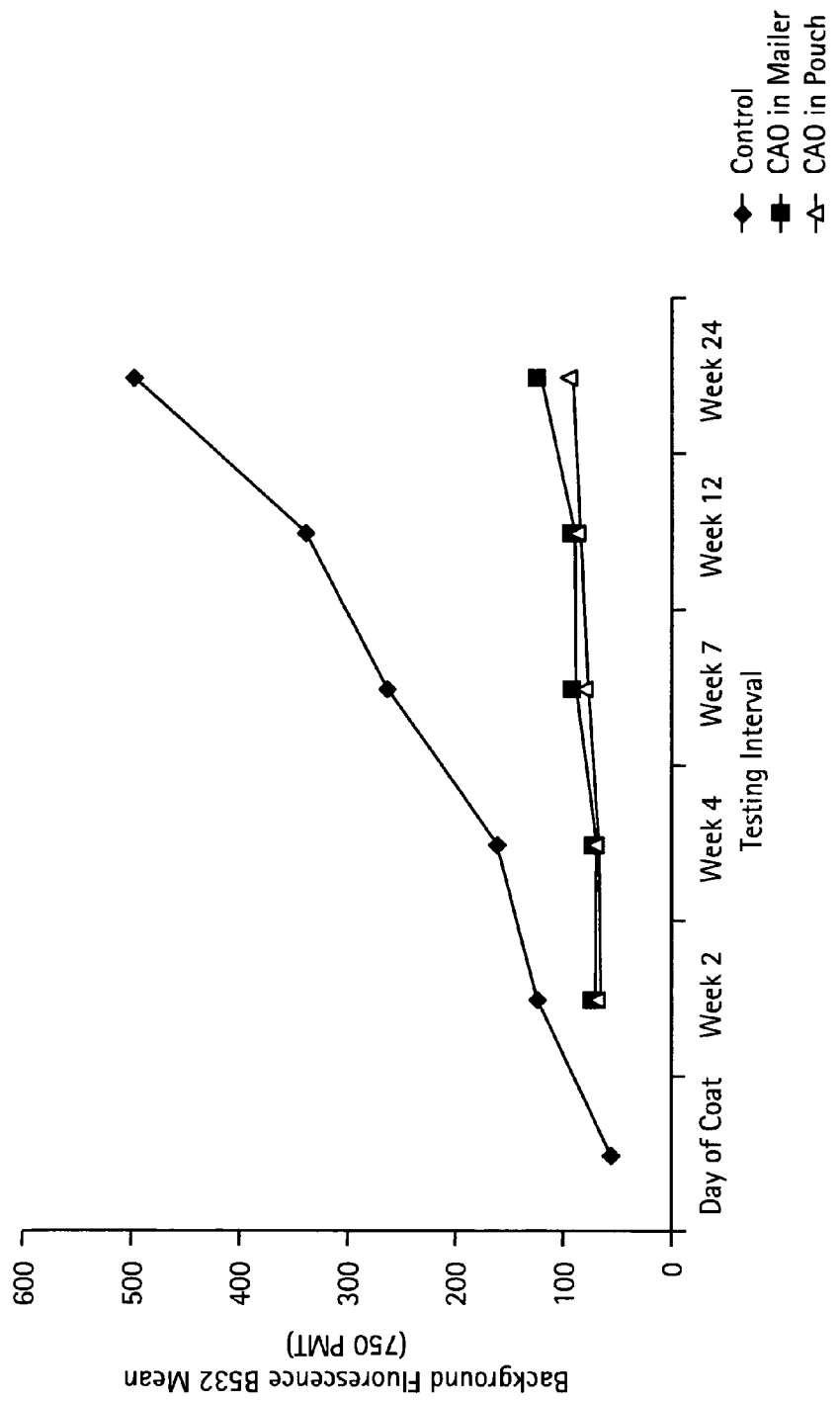

FIG. 13 compares the relative degree of background fluorescence over a period of up to twelve weeks from original coating for amine-coated slides that have been stored either with (mailer and pouch) the presence of CaO or without (control) in storage containers or packages. As can be seen, the control sample that did not contain CaO in the package exhibit a dramatic increase in background fluorescence as time progresses, indicating the adhesion of organic compounds to slides and degradation of the substrate's surface chemistry. In contrast, the slides in the packages that contain CaO show a relatively stable surface chemistry, and a level of background fluorescence, comparable to that observed on the date of original coating, sustained over an extended time period. Hence, the presence of sorbent materials can prolong the desired properties and life of the coated substrate.

Figure 14:
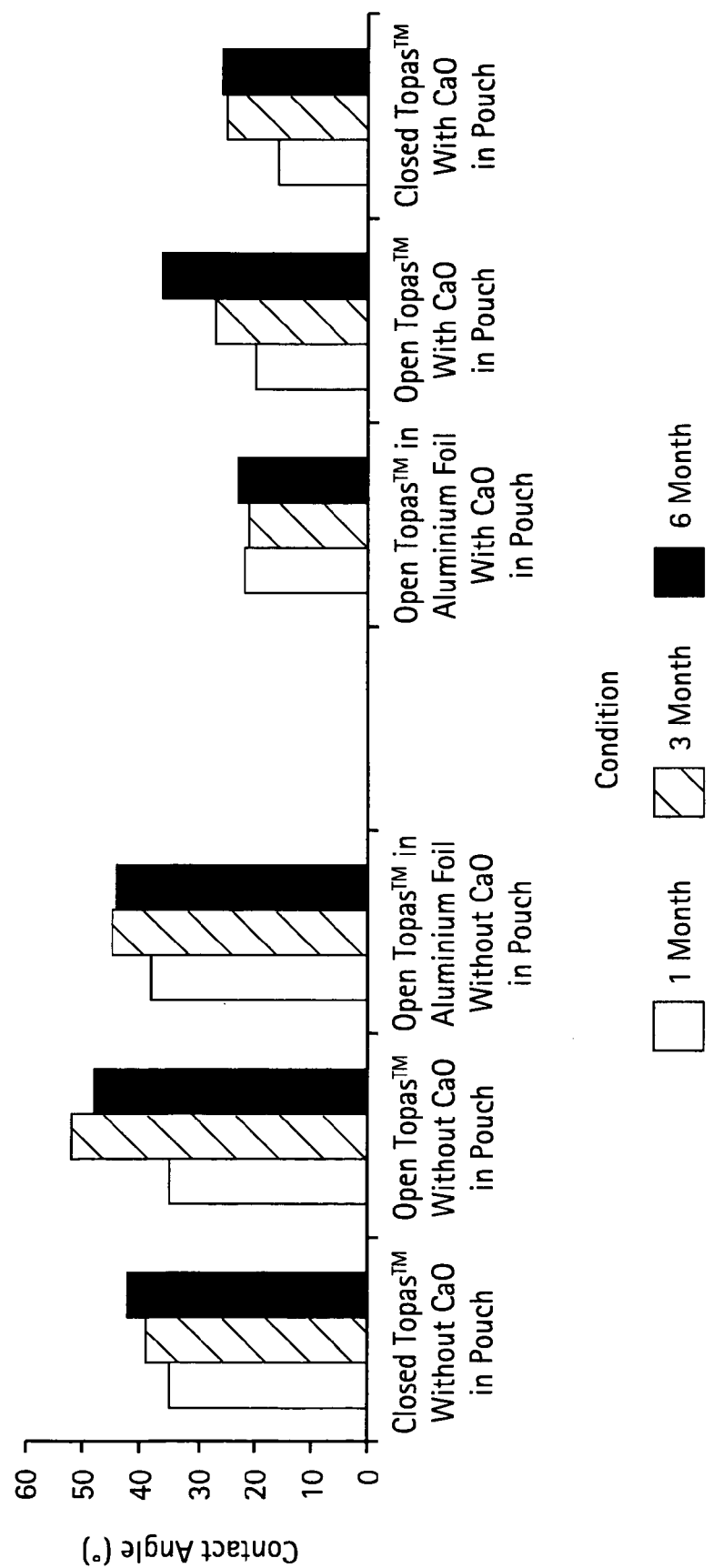

FIG. 14 summarizes the results of water wettability tests for amine-coated slides after storage for 1, 3, and 6 months both in the presence and absence of CaO.

FIG. 15 summarizes the results of Cy3 background fluorescence on amine-coated slides after storage for 1, 3, and 6 months both in the presence and absence of CaO.

DETAILED DESCRIPTION OF THE INVENTION

The present invention addresses the need for a technique or system which can either prevent or at least retard degradation of the biomolecule-binding surface chemistry, in particular amine coatings, on inorganic slides, which can result from interaction with either atmospheric carbon dioxide and/or organics contaminants over time, when either in storage or transport. According to the invention, the introduction of a carbon dioxide and organic chemisorbent in the packaging of amine-coated slide substrates can preserve the functionality of amine moieties and the hydrophilicity of the substrate surface. These measures in part, as detailed further below, help to maintain some of the attributes of a "good" amine-coated substrate for biological array purposes, such as hydrophilicity (e.g., water contact angle of 30±5°), a slightly positively charged surface (—$NH_3^+$), a uniform coverage with amine functions as tested by colloidal gold staining, a low auto-fluorescence background, and a low non-specific binding of labeled ligands. Conventionally, these attributes are gradually lost after several months of aging.

Section 1—Carbon Dioxide

Even though carbon dioxide ($CO_2$), a natural component of the atmosphere, comprises only about 0.035% by volume of terrestrial air, its presence can impact significantly certain chemistries and fabrication operations. For example, the petrochemical industry has long been concerned about carbon dioxide gas, and has over the years developed certain cost effective means for controlling its presence, as well as to eliminate acidic components of natural gas. A similar need to control the affect and presence of carbon dioxide as it relates to preserving the surface quality, performance, or functionality of coated substrates for biological analysis devices, however, has only recently been recognized, and hence the techniques used to address this need have been less developed.

Inorganic substrates for microarrays, such as glass slides, are often treated with a surface coating to create a surface chemistry that imparts or improves their ability to immobilize a variety of biological species, particularly deposited or printed arrays of nucleic acid or membrane-proteins (e.g., G-protein coupled receptor (GPCR)). Assessments of different surface chemistries have shown that, among the important parameters for creating a suitable coating to deposit biological moieties or molecules, two features—the presence of amine functions, and maintenance of a certain level of hydrophilicity; or in other words, water wettability—are particularly important. A good-quality, amine-coated substrate should exhibit the attributes of hydrophilicity (water contact angle of about 50°, preferably ≦40°, more preferably about 38° or 35°, or less), a surface having a slightly positively charge (—$NH_3^+$) to interact with biological moieties having a slightly negatively charge, a uniform coverage with amine functions, a low auto-fluorescence background, and a low non-specific binding with target molecules, such as labeled ligands. Binding assays performed on several types of surfaces have been investigated. Glass or silicate surfaces modified with, for instance, γ-aminopropylsilanes (GAPS) were found to provide the desired combination of properties.

Numerous phenomena may affect the nature and performance of the surface chemistry of slides. Typically, the surface properties of solid inorganic substrates are characterized by means of specific indicators, such as water contact angle, colloidal gold staining, or background fluorescence across the surface of a slide. When subject to either environmental conditions or in packaging material that affects negatively the coated surface chemistry, one typically observes a significant change in one or more of these indicators. Following the preparation and coating of the substrate surface, several possible short-term molecular processes may impact the properties of slides, such as completion of hydrolysis and condensation reactions of alkoxy groups with silanol groups, or orientation or conformation of the aminopropyl groups on the substrate. In the longer term, however, after analyzing the water contact angle and colloidal gold staining ability, we have discovered that two major phenomena are responsible for accelerating the aging mechanisms on amine-coated substrates. When amine-coated glass substrates are exposed to either carbon dioxide or organics for periods of even a few (e.g., 3 or 5) days, the hydrophobic characteristic increases, while the staining ability decreases rapidly. The ability to maintain a stable level of hydrophilicity of the coating for glass slides is very important. The first factor involves a reaction between amine functions and atmospheric carbon dioxide. The second factor may be related to the adsorption of organic compounds released from organic or polymer plastic components of the substrate packaging (e.g., plastic mailers or pouches).

Under conditions in which the carbon dioxide concentration is constant, the integration of Equation [2], above, leads to an exponential decrease of the amount of free amine functions with time. The surface concentration of amine functions on GAPS-coated slides varies with time as:

$$|Am|=|Am|_0 e^{-Kt} \qquad [3],$$

where |Am| is the amine surface concentration at time t, $|Am|_0$ the initial concentration (t=0), and K a constant including the kinetic constant and the constant carbon dioxide concentration.

In the presence of moisture, the carbamate ion may further react to form bicarbonate (S. Satyapal et al., *Energy &Fuels*, 15, pp. 250–255 (2001)):

$$RNHCOO^-RNH_3^+ + 2H_2O + CO_2 \rightarrow 2(RNH_3^+, HCO_3^-) \qquad [4].$$

Bicarbonate may also form directly from the amine+$CO_2$+water reaction:

$$RNH_2 + CO_2 + H_2O \rightarrow RNH_3^+, HCO_3^- \qquad [5].$$

Therefore in the presence of water, one mole of amine reacts with one mole of $CO_2$. This mechanism has been discussed in the literature (K. Otsubo, et al., *International Symposium on Space Technology and Science, Proceedings*, vol. 2; pp 1431–1438 (1992)).

Figure 1:
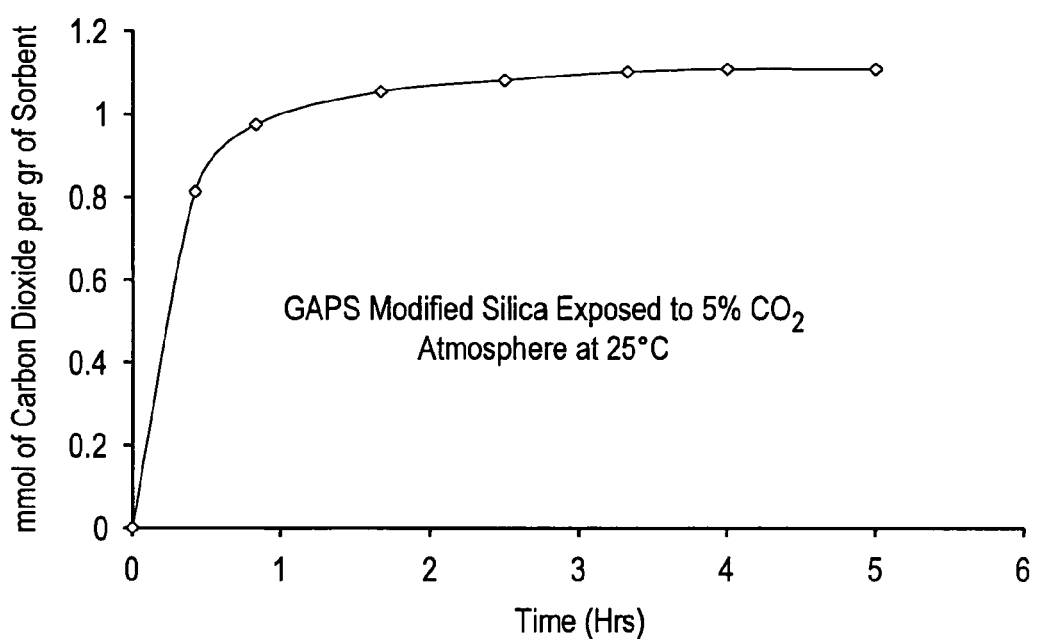
FIG. 1 shows the efficiency of adsorption at 25° C. of carbon dioxide (milli-mol. $CO_2$/gram sorbent) on amine-modified meso-porous silica.

The reaction of $CO_2$ with amine in the past was used to develop selective sorbents for acidic gas (containing $CO_2$ or $H_2S$) from amine-surface-modified silica xerogel and mesoporous silica (MCM-48) (Huang et al., *Indus. Eng. Chem. Res.*, 47, 2427–2433 (2003)). The $CO_2$ uptake on the 3-aminopropyl-functionalized MCM-48 sample was measured and the results are shown in FIG. 1. In the study the concentration of $CO_2$ in the atmosphere was 5%. The MCM-48 has a specific area of 1389 m²/g. The silane coverage is of 2.3 mmol of silane per gram of sorbent which corresponds to coverage of 1 amine function/nm², which is very close to the value found from our recent wetting study on GAPS surfaces (1.2/nm²) (A. Carré, V. Lacarrière, W. Birch, *J. Colloid Interface Science*, 260, pp. 49–55 (2003)).

Quantitative analysis of the $CO_2$ adsorption amount indicates that the amount of $CO_2$ adsorbed is twice when water is present during the adsorption. This result is consistent with the fact that the mechanism for the $CO_2$ adsorption is dependent on the presence of water. Hence, two moles of amine groups adsorb one mole of $CO_2$ molecules to form carbamate when water vapor is absent from the reaction. In the presence of water, 1 mole of amine groups reacts with 1 mole of $CO_2$ to form bicarbonate. Water vapor enhances $CO_2$ adsorption on amine-modified surfaces.

After exposure to carbon dioxide, a fraction of amine functions is transformed into carbamate (or bicarbonate), so that the aged surface of a GAPS substrate may be seen as a composite surface formed of carbonated and free amine functions. If x is the fraction of free amine functions at time t, the cosine of the water contact angle, θ(t), may be expressed from the equation by Cassie and Baxter, (A. B. D. Cassie and S. Baxter, *Trans. Farad. Soc.*, 40, p. 546 (1944), incorporated herein), as:

$$\cos \theta(t) = x \cos \theta_0 + (1-x) \cos \theta_\infty \qquad [6],$$

where $\theta_0$ is the initial water contact angle on fresh slides where 100% of amine functions are not carbonated, and $\theta_\infty$ is the wetting angle when 100% of amine functions are carbonated.

A. Reaction Between Amine Functions and Carbon Dioxide

Figure 2A:
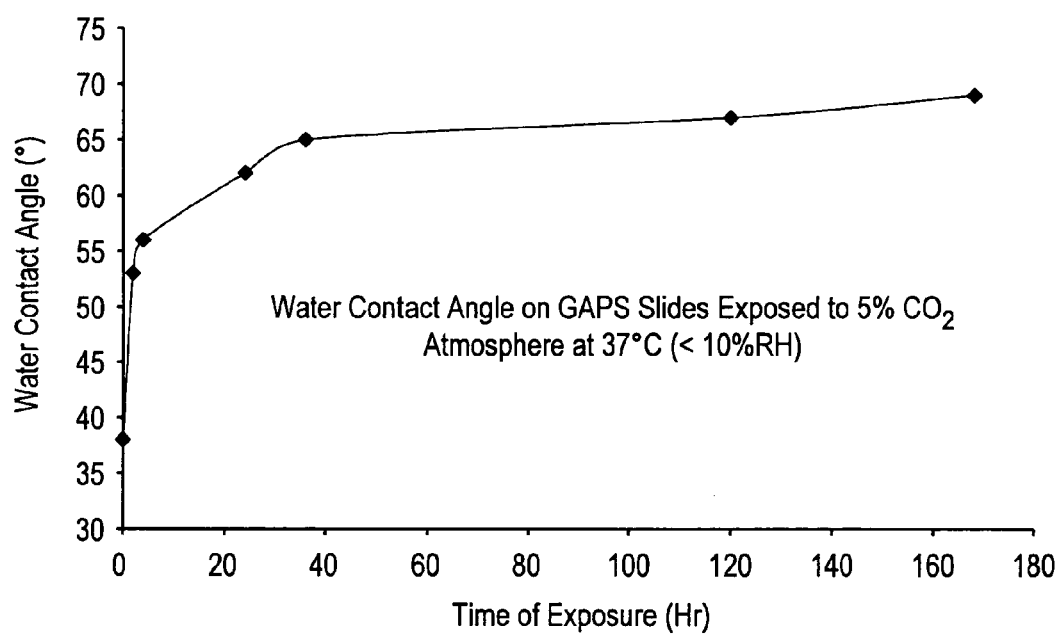
FIGS. 2A and 2B are graphs showing effect on the contact angle on amine-coated slides after exposure to an atmosphere of 5% $CO_2$ at 37° C.
Figure 2B:
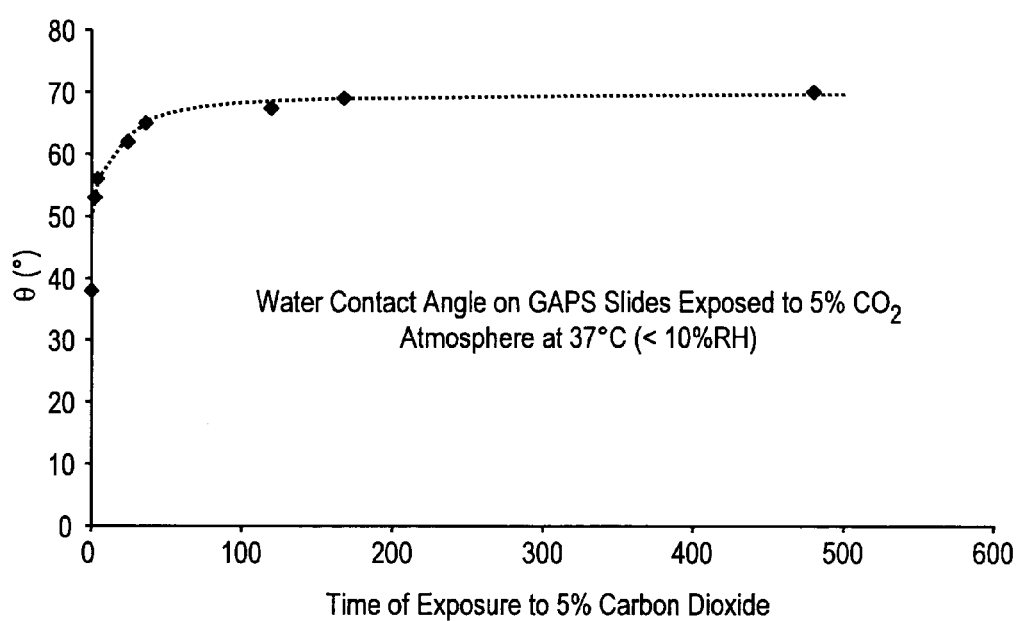

Maintaining a relatively stable level of hydrophilicity on amine-coated substrates is very important for the immobilization of biological arrays and the function of biological assays executed using such arrays. Several molecular processes, however, can detrimentally modify the surface composition and wettability of amine-coated slides. One such process is carbonatation of amine functions by atmospheric carbon dioxide. GAPS-coated slides that were exposed to 5% carbon dioxide, at 37° C., and relative humidity (RH) <10% were evaluated to determined the impact of carbonatation on the surface properties (wettability, staining of amine functions). By means of a simple characterization test—the sessile-drop technique, which consists of measuring the wetting or contact angle of water on the solid surface—one can ascertain the water wettability. The contact angle is determined from the profile of about a 2 μl drop at the point of contact with the solid surface. This can be done directly with a contact angle goniometer equipped with an eyepiece. The accuracy of the method is ±2°. The water contact angle θ was followed as a function of time of exposure to carbon dioxide. The hydrophobicity of slides increases rapidly as shown in FIG. 2. The water contact angle reaches a plateau at 70° after 7 days (168 hrs).

In general, a variety of clean mineral oxide powders or solutions, composed of metal oxides are chemical sorbent of carbon dioxide and have the capacity of adsorbing organic contaminants present in, or released by, the packaging containers for the coated substrates. Suitable chemisorbent materials may be selected from the oxides of alkaline metals, alkaline earth metals, zinc, and/or silver. These oxide species react with carbon dioxide to form carbonates. Once the chemisorbent material fixes the carbon dioxide or organic components, the sorbent should not liquefy; but rather, should remain a dry solid or gel material. Several metal oxides show good potential as viable candidates for use as $CO_2$ sorbents in life science support systems. Table 1 presents the respective densities, and $CO_2$ sorption capacities, and regeneration energies for various alkaline, alkaline earth, and transition metal oxides. The reaction of these oxide species with carbon dioxide is thermodynamically favored as $CO_2$ chemisorbents.

TABLE 1

| Metal oxide | Density (g/cm³) | CO₂ capacity (g CO₂/g oxide) | Regeneration Energy (kJ/g CO₂) |
|---|---|---|---|
| Li₂O | 2.01 | 1.471 | 5.146 |
| Na₂O | 2.27 | 0.709 | 7.309 |
| K₂O | 2.32 | 0.468 | 8.895 |
| Rb₂O | 3.72 | 0.235 | 9.172 |
| Cs₂O | 4.36 | 0.156 | 9.279 |
| MgO | 3.65 | 1.092 | 2.681 |
| CaO | 2.62 | 0.785 | 4.042 |
| SrO | 4.70 | 0.425 | 5.249 |

TABLE 1-continued

| Metal oxide | Density (g/cm$^3$) | CO$_2$ capacity (g CO$_2$/g oxide) | Regeneration Energy (kJ/g CO$_2$) |
|---|---|---|---|
| BaO | 5.72 | 0.287 | 6.081 |
| ZnO | 5.47 | 0.540 | 1.616 |
| Ag$_2$O | 7.14 | 0.189 | 1.865 |

For purposes of the following discussions, calcium oxide (CaO), also known as quick lime, is used as an illustrative chemisorbent for CO$_2$ and organic contaminants, but the present invention should not be limited to this one species, rather other kinds of metal oxides, such as those listed in Table 1, can also be employed as particular parameters or conditions may dictate. In general, metal oxides trap carbon dioxide by forming metal carbonates. According to the invention, preferred embodiments of chemisorbent oxides are CaO, MgO, and ZnO. For an example, CaO reacts efficiently with carbon dioxide to form calcium carbonate. The sorbent material may come in a solid powder, and fixes CO$_2$ according to: CaO+CO$_2$=CaCO$_3$ (calcium carbonate). Hence, adding calcium oxide as part of or within the containers or packaging for amine-coated substrates as a getter for carbon dioxide could be a cost effective, economical solution to preserve the properties of GAPS-coated slides and GPCR substrates when in storage over long durations of at least 6–9 months, preferably about 1 year or more. As relatively inexpensive materials, calcium oxide or magnesium oxide is preferred as the chemisorbent, hence they are a commercially viable product.

Storage of amine-coated slides in the presence of calcium oxide reduces the aging of slides. Calcium oxide is a getter or sorbent of carbon dioxide and possibly of other organic contaminants released from plastic mailers. In the experiments reported above, calcium oxide was directly introduced in the plastic packages or mailers. As possible alternatives, the calcium oxide may be introduced in the lid of plastic mailers, or in the sealed pouch containing the mailer. The calcium oxide may be under the form of powder in a porous paper bag, or under the form of a pastille or pill of compacted powder.

The selection of application sorbent materials is not trivial. Hence, the present invention should not be reduced to a mere choice of material reagents. For example, even though lithium hydroxide (LiOH) is the most commonly used CO$_2$ sorbent for use in expendable devices, the endothermic formation of lithium carbonate when fixing carbon dioxide makes this species less attractive for the present purposes. Significantly, the presence of water vapor is important and required for the functioning of LiOH as a carbon dioxide getter. For the net reaction, two moles of water are liberated for each mole of CO$_2$ chemisorbed. This means that as carbon dioxide is taken out of the atmosphere, the contents of the packaging will become more humid or wet. Hence, LiO$_2$ would not be a preferred, viable candidate as a sorbent, since it tends to generate liquid when reacting with CO$_2$. As, mentioned before, the present of water vapor can accelerate the degradation of amine-coated substrate surfaces. Furthermore, the overall selection of viable embodiments should consider of several parameters. Certain metal oxides, which may work well to adsorb CO$_2$, are not preferred embodiments because of either their respective reactive nature, chemical safety or level of hazard, and relative expense, such as summarized for some examples in Table 2.

TABLE 2

| Metal oxide | Hazard |
|---|---|
| Li$_2$O (LiOH) | Corrosive |
| Na$_2$O (NaOH) | Corrosive |
| K$_2$O (KOH) | Corrosive |
| Rb$_2$O | Corrosive, flammable |
| Cs$_2$O | Corrosive, flammable |
| MgO | None |
| CaO | Irritant |
| SrO | Corrosive |
| BaO | Corrosive, moisture sensitive, oxidizing |
| ZnO | None |
| Ag$_2$O | Irritant, oxidizing |

It was found that glass substrate surfaces, preferably glass with a low sodium-content, modified with a uniform coating of 3-aminopropyltriethoxysilane (GAPS) provide the desired combination of properties for creating a high quality surface suited not only for binding DNA, but also for immobilizing membranes and membrane proteins.

The respective auto-fluorescence level on the amine-coated substrates is not an absolute parameter as measured in Relative Fluorescence Unit (RFU). Rather, the RFU number may depend on the particulars of the fluorospectrometer used, the photomultiplier setting (PMT), and the wavelength (channel). Generally, however, the amine-coated substrate should exhibit a stable and low auto-fluorescence of ≦150 RFU as measured in a Cy5-wavelength channel at about 600–750 PMT over a time period of at least about three months, preferably about twelve months or longer. Particular examples were measured on a Genepix 4000A scanner on Cy3 and Cy5 channels at 650 PMT.

Plastic Packaging as a Source of Organic Contamination

As the oxides of calcium (CaO), magnesium (MgO), zinc (ZnO), or the other metal oxides, can be used in a getter to eliminate atmospheric carbon dioxide during storage and packaging of GAPS-coated substrates. The addition of such oxides in packaging for GAPS-coated slides allows one to maintain a low level of auto-fluorescence. As a common and general phenomenon, polymer or plastic materials tend to release small amounts of organic compounds such as low molecular weight compounds, plasticizers, stabilizers, lubricants. Since organic surfaces tend to have relatively low surface energy (i.e., <100 milli-joules/m$^2$), the sorbent should have a high-surface energy of at least about 100 milli-joules/m$^2$, preferably ≧10 or 150 milli-joules/m$^2$, to absorb volatile organic compounds. One gram of organic molecules can cover about 1000 m$^2$ of surface area. Numerous other organic molecules have been identified as contaminants of biological array solid surfaces. Some organic contaminants that are identified on GAPS slides include: dibutylphthalate, alkanes, various aromatics, phenol, and silicones. Those organics molecules tend to generate auto-fluorescence, which are detrimental to the analysis of biological arrays. It is believe that this result is because CaO, as any high surface energy material, more easily catches organic molecules; hence, acting as a "vacuum" cleaning the insides atmosphere of substrate packages. Although carbonatation of amine functions occurs in the atmosphere, this phenomenon does not imply that it may happen in a closed plastic or polymer container, such as Evergreen™ (PP) or Topas™ mailers. No particular control of the inside atmosphere in packaging is taken in manufacturing. As air contains 0.035% of carbon dioxide and 0.2–1.7% water (10–70% RH at 20° C.), there is enough water molecules relatively to $CO_2$ molecules to transform initial carbamate into bicarbonate. The presence of both carbamate and bicarbonate, however may be not excluded. For instance, in a mailer containing 5 slides, about $1.8 \times 10^{17}$ $CO_2$ molecules are present. With 1.2 amine functions per $nm_2$, there are $2.3 \times 10^{16}$ amine functions on 5 slides in a mailer. Then, $CO_2$ molecules are present in a large excess relatively to amine functions.

The presence of free amine functions is currently tested by dipping amine-coated slides in a gold colloidal suspension (Colloidal Gold Total Protein Stain, BioRad). The colloidal gold staining test is used to control the presence and distribution of free amine functions on the coated slides (Colloidal Gold Total Protein Stain, Bio-Rad Laboratories). The auto fluorescence background of slides was controlled by measuring fluorescence intensities with a scanner on Cy3 and Cy5 channels (Genepix Scanner). A blue stain is obtained in presence of amines and the stain uniformity indicates their macroscopic repartition on the substrate. It was observed, that the colloidal gold staining of GAPS slides decreases and is completely lost after 5 days (120 hrs) of exposure to 5% $CO_2$.

Although air contains only 0.035% of carbon dioxide, amine functions can react with it and the number of free amine functions decrease with time. At 0.035% of concentration, one can estimate that the plateau value for the water contact angle corresponding to the completion of the carbonatation reaction will be reached after about 3 years. The gold stain of slides is usually lost after several months in current packaging conditions.

To demonstrate and accelerate the reaction between amine functions and carbon dioxide, GAPS II type slides were exposed to 5% carbon dioxide (37° C., relative humidity RH<10%). The water contact angle and the stain ability of slides were followed as a function of time of exposure to carbon dioxide. The hydrophobic characteristic of slides increased rapidly, as shown in FIG. 2A.

The colloidal gold staining of GAPS slides decreased and was completely lost after 5 days (120 hrs) of exposure to 5% $CO_2$. When slides are exposed to normal atmosphere, their wettability and stain ability are not affected on the short period of time (7 days) considered in the FIG. 2A.

Carbonatation reactions may be involved in the slow aging process of slides when exposed to atmosphere for months or years. The air volume in a plastic mailer where are stored 5 slides is about 20 cm³. As air contains about 0.035% by volume of carbon dioxide, the number of molecules of carbon dioxide is about $1.8 \times 10^{-17}$ in a mailer. According to a recent study, the estimated number of free amine functions (silane molecules) per unit area on a GAP-coated slides is on the order of about $1.2/nm_2$ (A. Carré, V. Lacarrière, and W. Birch, "Molecular interactions between DNA and an aminated glass substrate", *J. Colloid and Interface Sci.*, 26, 49–55 (2003)).

Results indicate that about 1 to 1.25 GAPS molecule/nm² are present on high surface area silica substrates. In a mailer containing 5 slides, the number of amine functions can be estimated as being of the order of $2.3 \times 10^{16}$. Hence, the number of carbon dioxide molecules present in a mailer is about 10 times the number of amine functions. There is enough carbon dioxide to fully carbonate the amine functions of slides. The XPS spectrum of GAPS-coated slides exposed to air for about one week reveals the reaction with atmospheric carbon dioxide by the appearance of a carboxylate peak.

Section II—Regeneration of Carbonated Substrates

Carbon dioxide forms carbamate with amines under dry conditions. On meso-porous silica modified with aminopropyltriethoxysilane, carbon dioxide forms bicarbonate in the presence of water vapor. (H. Y. Huang, et al., *Ind. Eng. Chem. Res.*, 47 (12), pp. 2427–2433 (2003)). The product of the reaction between carbon dioxide and primary or secondary amines is the amine salt of the carbamic acid. The reaction with a primary amine is the following:

When moisture is present, further reaction of the carbamate ion to form bicarbonate occurs:

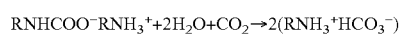

Bicarbonate may also form directly from the amine+$CO_2$+water reaction:

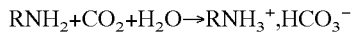

According to the present invention, we describe a method of removing $CO_2$ or organic contaminants from a package containing an amine-coated substrate. The method comprises: providing a carbonated substrate and either a sorbent material that is reactive with $CO_2$ and having a high-surface energy of $\geq 100$ milli-joules/m² for removing organic compounds, or a solution of either calcium, magnesium, or zinc hydroxide, ($Ca(OH)_2$, $Mg(OH)_2$, $Zn(OH)_2$), with a pH value $\geq 8$, or a combination of said hydroxides; exposing a carbonated surface of said substrate to either said sorbent material or said hydroxide solution, or both, wherein either said solid sorbent or said solution of either $Ca(OH)_2$, $Mg(OH)_2$, or $Zn(OH)_2$, or said combination regenerates free amine functionality on said surface. The carbonated substrate surface is exposed to the hydroxide solution of either a single species or combination of species for a period of within one hour, preferably for a period of under about forty (40) minutes, but not less than about ten (10) minutes. It is believed that the hydroxide solution reacts to displace carbamic or carbonic acid groups on the effected amine-coated substrate, regenerating on the substrate surface a water contact angle θ of about 50° or less, preferably about 400 or less, more preferably about 30°±5°. Hence, reversing and restoring amine functionality on the substrate. Preferably, the solution has a pH value of at least 10 or 10.5, more preferably a pH of about 11–13.8 or 14.

We found that, according to a preferred, more efficient, and simple way to reverse the above chemical reactions, and to regenerate free amine functions, the carbonated substrate should be dipped in the hydroxide solution. For example, we observed the formation of a white precipitate in the solution, probably calcium carbonate, when the carbonated slides are dipped into a solution of calcium hydroxide, $Ca(OH)_2$, having a pH of about 12.5, according to an embodiment. This result may be understood as $Ca(OH)_2$ is a stronger base than the N-propylamine group ($K_b$ of $Ca(OH)_2 = 3.74 \times 10^{-3}$, $K_b$ of N-propylamine=$5.1 \times 10^{-4}$) ("Dissociation Constants of Organic and Inorganic Bases in Aqueous Solution," *Handbook of Chemistry and Physics*, CRC Press, 58th Edition, 1977–1978).

The precipitation of calcium carbonate makes the regeneration of free amine functions relatively quickly (20 minutes) and complete, by displacing the carbamic or carbonic acid. This kind of treatment allows one to restore amine-coated substrates that have been degraded by exposure to carbon dioxide to their original wettability and stain-ability. As shown in FIG. 11, this treatment allows restoring wettability and staining of GAPS slides artificially aged by exposure to an atmosphere containing 5% carbon dioxide for 15 days. After this artificial aging, the GAPS slide becomes hydrophobic with a water contact angle of 72° (initial value 38°). The colloidal gold staining intensity is reduced by a factor of about 2, indicating a reduction of the number of free amine functions on the aminated substrate. The dipping in the calcium hydroxide solution is beneficial as the water contact angle decreases to a value lower than 50°, and as the gold colloidal staining is recovered with an optical density (OD) equal or higher than the initial value.

Determining the proper duration of such treatments, however, is not trivial. Treatment with the hydroxide solution for an insufficient length of time (e.g., less than 10 or 15 minutes) may be not me sufficient to regenerate the surface for good staining ability, or produce a desired water contact angle. Depending on the actual conditions, too long of a n exposure (e.g., more than 40 or 45 minutes) may irreversibly damage the GAPS coating and slide itself. At high pH values, for instance, the siloxane bonds between the silane and the glass substrate could be broken, or the glass surface can be damaged by chemical etching, resulting in a low or no gold staining, and/or a lower contact angle than on freshly prepared slides. The OD of the colloidal gold staining decreases after about 40 minutes of dipping. Different, however, from the OD of the gold staining, the initial value of the hydrophilicity (water contact angle) of the GAPS slide is never completely recovered. Dipping in the calcium hydroxide solution produces a significant reduction of the water contact angle of more than 20°.

Section III—Organic Contamination

In the broad spectrum of contamination control, the term contamination has come to have diverse meanings when applied to surfaces. As more sophisticated techniques are developed for examining surfaces, there is more concern with cleanliness on atomic scale, such that adsorbed gases or trace amount of oxides on metals, for example, may be considered as contaminants.

A major concern is the presence of organic contamination on various inorganic surfaces. Organic materials commonly found in the laboratory environment are generally hydrophobic in nature, resulting in a tendency to consider that any hydrophobic mineral surface is generated by organic contamination getting onto the clean inorganic surface. In order to control surface contamination of materials, wettability measurements, which do not adversely affect the surface, provide a convenient and rapid method for probing the surface constitution of the outermost atomic layer. The technique is highly surface specific, generally exceeding the sensitivity of electron spectroscopies and sensitive to a fraction of monolayer. Wettability of oxide surfaces may be directly related to the amount of organic contaminant present on the surface. Contamination may be considered as an adsorption phenomenon. Surfaces become contaminated at different rates and to a different extent. The primary driving force for surface contamination is a reduction of the surface free energy. Perfectly clean oxidized metals, ceramics or glass surfaces will be rapidly contaminated on exposure to ambient air.

All surfaces are energetically unfavorable, since they have a positive free energy of formation. A simple explanation may be given by considering the formation of two new surfaces by cleaving a solid. Bonds have to be broken between atoms or molecules on both side of the cleavage plane, splitting the solid and creating two new surfaces. Breaking the bonds requires work, resulting in a positive contribution to the total free energy of the system. The majority of this added energy generates the surface free energy of the two new surfaces. Organic surfaces tend to have low surface energy (i.e., <100 milli-joules/m$^2$).

Degradation of a coated substrate surface, from exposure to packaging materials, can result in variable or unacceptably large increases in the background fluorescence of a slide when measured in a fluorescence scanner. High background signals interfere with measurement of binding activity. In addition, contamination can result in changing spot morphology (i.e., the diameter of printed biological material across a slide or from slide to slide) and an increased tendency for spots to merge and poor biological material retention on the coated surface.

Many of the containers for storing and shipping substrates presently used in the immobilization of biomolecules are made from commonly available commodity resins. These resins include, but are not limited to certain polypropylene, polystyrene and acrylo-nitrile-butadienestyrene (ABS). Applicants have performed extensive testing of GAPS coated slides stored with a variety of conventional slide packaging materials, and experiments have shown that several of these materials contribute to the degradation of contact angle and increase in background fluorescence of slides when measured in a microarray fluorescence scanner. We have also discovered several materials, some of which include ABS materials and polystyrenes, that do not contribute to the surface degradation of the slides.

While the present invention should not be limited by any particular theory, it is believed that out-gasing of low molecular weight materials from the packages made from these materials are deposited on the slide surfaces, which changes the hydrophobicity of the surface and/or increases the background fluorescence of the slides. In order to obtain uniform spotting or deposition in the manufacture of microarrays, the water contact angle should be consistent across the surface of individual slides and among various manufacturing lots and background fluorescence should be as low as possible.

The wettability, on GAPS-coated slides stored in polymer containers, such as Evergreen™ (PP) and Topas™ mailers, was recorded over a period of about 6 months. The data are reported in FIG. 3. The linearity of cos θ(t) with time (t) is fair enough. But, the slope is higher in Evergreen (PP) than in Topas. Therefore, the aging process is not identical in the two kinds of mailers, although carbonatation should occur in both packaging. One explanation may be that another aging mechanism is involved. It is believed that the other aging mechanism is organic contamination.

The optimal wettability of GAPS slides correspond to a water contact angle of about 30°. After a few days following their manufacture, fresh slides have a water contact angle in the range of about 25–30°. But after several weeks, the water contact angle increases to 35–40°. Other properties such as the stainability of amine functions and an increase of the level of auto-fluorescence indicate an alteration of the coating properties.

The term contamination has come to have diverse meanings when applied to surfaces. As more sophisticated technologies are developed on functionalized surfaces, there is more concern with cleanliness on atomic scale. Adsorbed gases or trace amount of organic compounds may be considered as contaminants. The phenomenon of molecular adsorption that generates organic contamination is particularly evident on clean inorganic surfaces, but it exists also on reactive, functionalized organic surfaces. All surfaces are energetically unfavorable, since they have a positive free energy. The surface free energy may be minimized in several ways. For example, liquid droplets in free space are spherical when external forces, such as gravity, are negligible to minimize their surface. The reorganization and orientation of molecules or atoms at surfaces is also driven by a reduction in the surface free energy.

Another way to reduce the surface free energy is to coat surfaces with molecules that lead to a sharp reduction of the surface energy. This approach is developed in section 2.1, below. Physical adsorption (physisorption) and chemical adsorption (chemisorption) are the two principal modes of adsorption of molecules on surfaces.

To eliminate carbon dioxide in packaging, a small filter paper bag containing CaO powder was placed in the pouch containing a 5 slide mailer made of a cyclic olefin copolymer (e.g., CAS# 26007-43-2, Topas® by Celanese, AG) (CaO bag beside the mailer). KNF and Perfectseal pouches were considered. A clean glass box ("glass boat") and aluminum foil were also considered as models of organic free "pouches".

The impact of packaging slides in presence of CaO was tested in the following conditions. Uncured GAPS II type slides were prepared at FRC in batches of 10 slides. Then, 5 slides of the same batch were placed in Topas mailers. For each storage condition, 5 slides were stored in presence of CaO and 4 slides were stored without CaO (slides of the same batch). One slide was used for controlling each batch quality.

CaO was prepared by heat treating CaO powder (Aldrich Chemicals) overnight at 850° C. to form quick lime. About 0.5 g of CaO was placed in a paper bag made from filter paper (5891 Black Ribbon Ashless Filter Paper Circles Φ 150 mm). Different storage conditions were considered. The Topas mailers were placed either in pyrolyzed glass boat, or in wrapped in aluminum foil (no pouch), or in sealed Perfectseal pouch and in sealed KNF pouch. The slides were characterized from the water contact angle, the auto-fluorescence (Cy3 and Cy5 backgrounds measured on Genepix Scanner 4000A at 650PMT) and by colloidal gold staining.

The water contact angles on GAPS II type slides after 1, 2 and 3 months of storage are presented in FIG. 8. The water contact angle stays in the desired 25–30° when slides are stored in presence of CaO, except in the glass boat. The glass boat may be not hermitic enough to prevent the external carbon dioxide to enter into the glass box; thus it may be deactivated.

After about three months of storage in a carbon-dioxide-free, fully hermitic packaging with the presence of CaO, the impact on the quality of printed GPCR arrays and on the performances of binding assays appear to be positive. Results indicate a lower (non-specific) binding of fluorescently labeled ligands on GAPS-coated slides stored in Topas mailer and in Perfectseal pouches containing calcium oxide. The Cy3 background stays low after 3 months of storage for all packaging conditions with CaO except again in the glass boat (probably the same reason as for the increase of the water contact angle, i.e. lake of hermiticity) as shown in FIG. 9. For clarity, the variation of the water contact angle after 1 to 3 months of aging in hermetic packaging in presence or absence of CaO is reported in FIG. 10. The water contact angle stays in a desired 25°-30° range and in particular when slides are in Topas mailer placed into a sealed pouch. The water contact angle and the auto-fluorescence stay at the level of a fresh slide after 3 months of storage. The Cy5 background stays low in all cases (not shown). The colloidal gold staining stays intense for at least a three-month period.

Figure 4:
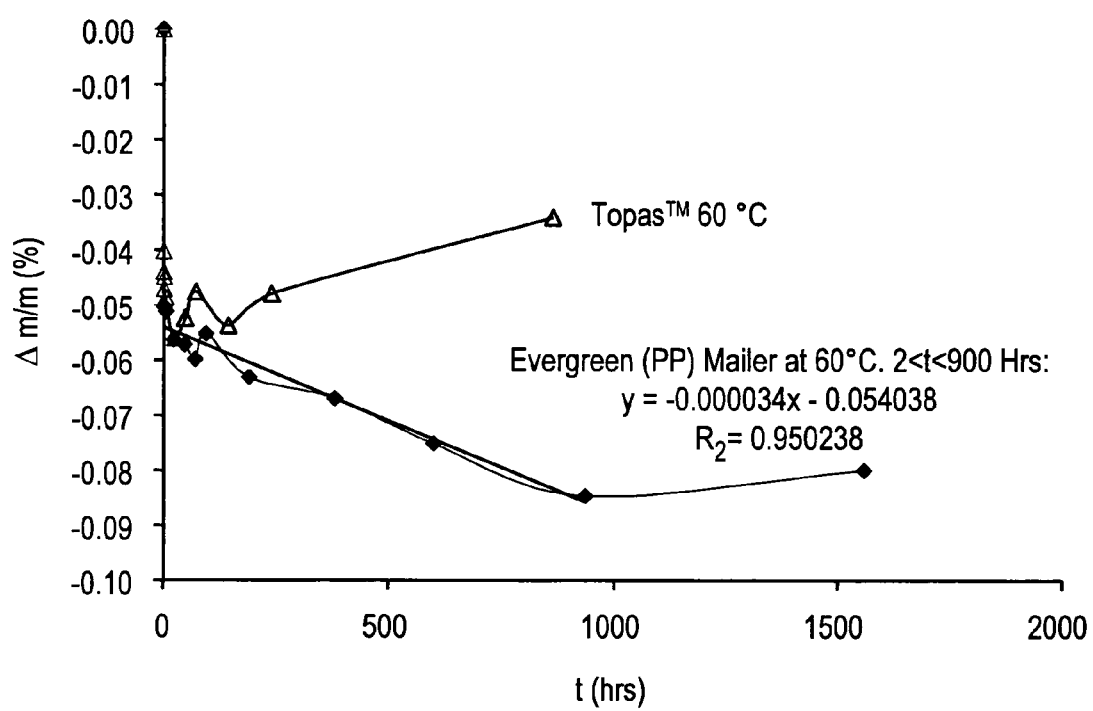
FIG. 4 shows a graph of weight loss (%) of Evergreen (PP) and Topas mailers at 60° C. On Evergreen (PP) data the linear regression is made for 2<t<900 hrs.

The likelihood of contamination from organic materials or components used in the packaging materials (e.g., KNF and Perfectseal™ pouches, Evergreen (PP) and Topas mailers) for amine-coated substrates increase under warmer or hotter temperature conditions. For example, experiments with Evergreen (PP) mailers indicate a weight loss of $3.4 \times 10^{-7}$ g/(g.hr) between 2 and 900 hrs of heating at 60° C. as shown in FIG. 4. The fast weight reduction observed after 2 hours at 60° C. is likely due to the fast elimination of water from the material (drying). The weight loss of Topas mailers seem to be much smaller after the water loss step. Glass amine-coated slides were stored in different conditions to determine the impact of the nature of the mailer (Evergreen (PP), Topas) and of the pouch (KNF, Perfectseal), containing the mailers, on the water wettability and the Cy3 fluorescent background of slides. Storage of slides in a clean glass boat served as a control reference for organic-free packaging. The results after 12 and 35 days of storage are presented in FIGS. 5 and 6.

Figure 5:
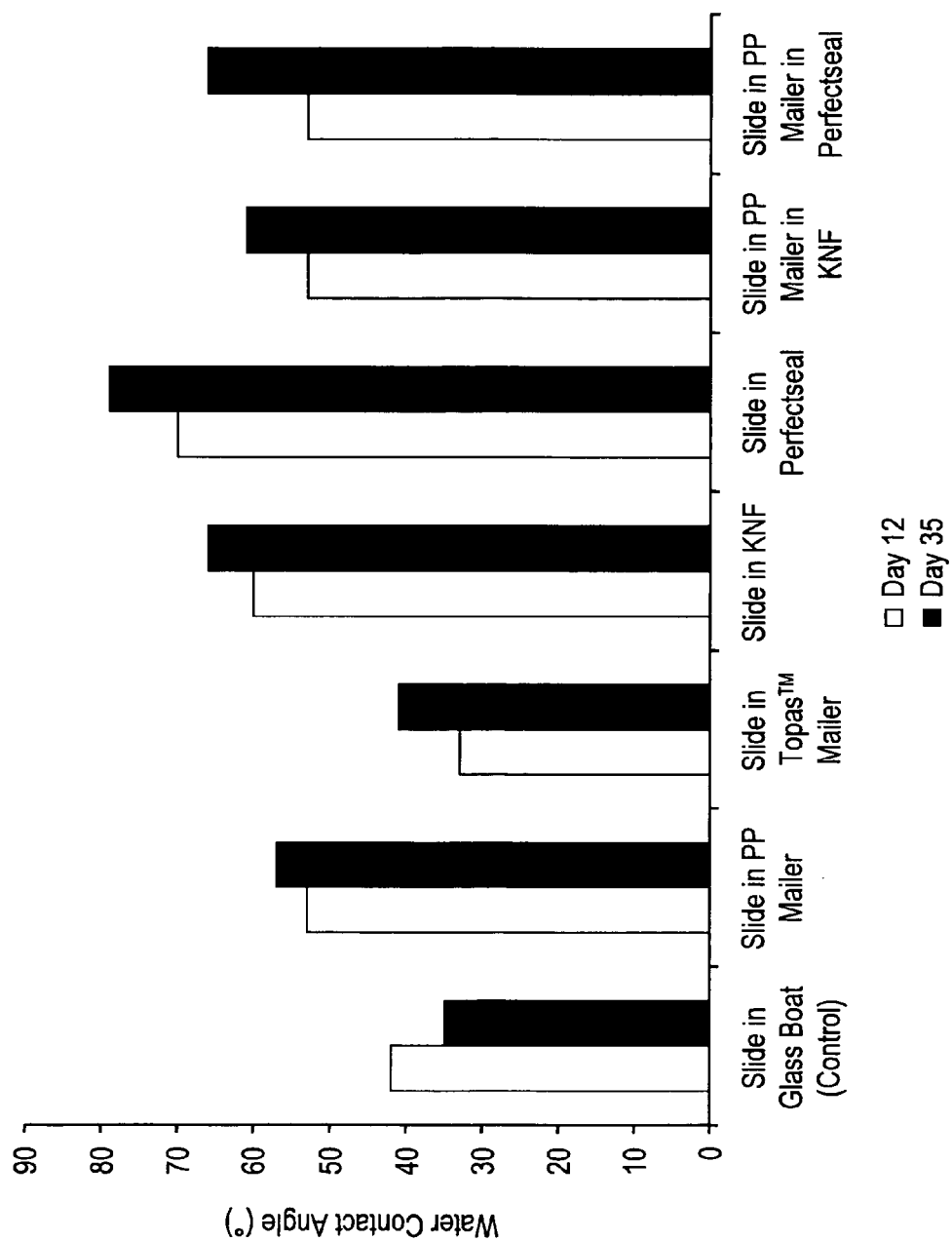
FIG. 5 shows the evolution of the water contact angle as a function of storage time in different packaging conditions (glass boat, mailers, pouches, mailer in pouch).

As FIG. 5 shows, after 35 days of storage, the wettability decreases. The water contact angle increases when the slides are directly stored in pouches, while the angle stays in about the 35° range when the slides are stored in the glass boat. It was also observed that the fact that the pouch is thermally sealed or stapled does not change the value of the contact angle obtained for the two kinds of pouches. Therefore, the thermal sealing itself does not seem to generate more organic contamination. The slides stored in Evergreen (PP) mailers and in the two kinds of pouches give higher contact angles than the slide stored in an Evergreen (PP) mailer without pouch. After 35 days of storage, the slides stored both in the pyrolyzed glass boat and in the Topas mailer kept the same wettability and background as freshly fabricated slides.

Figure 6:
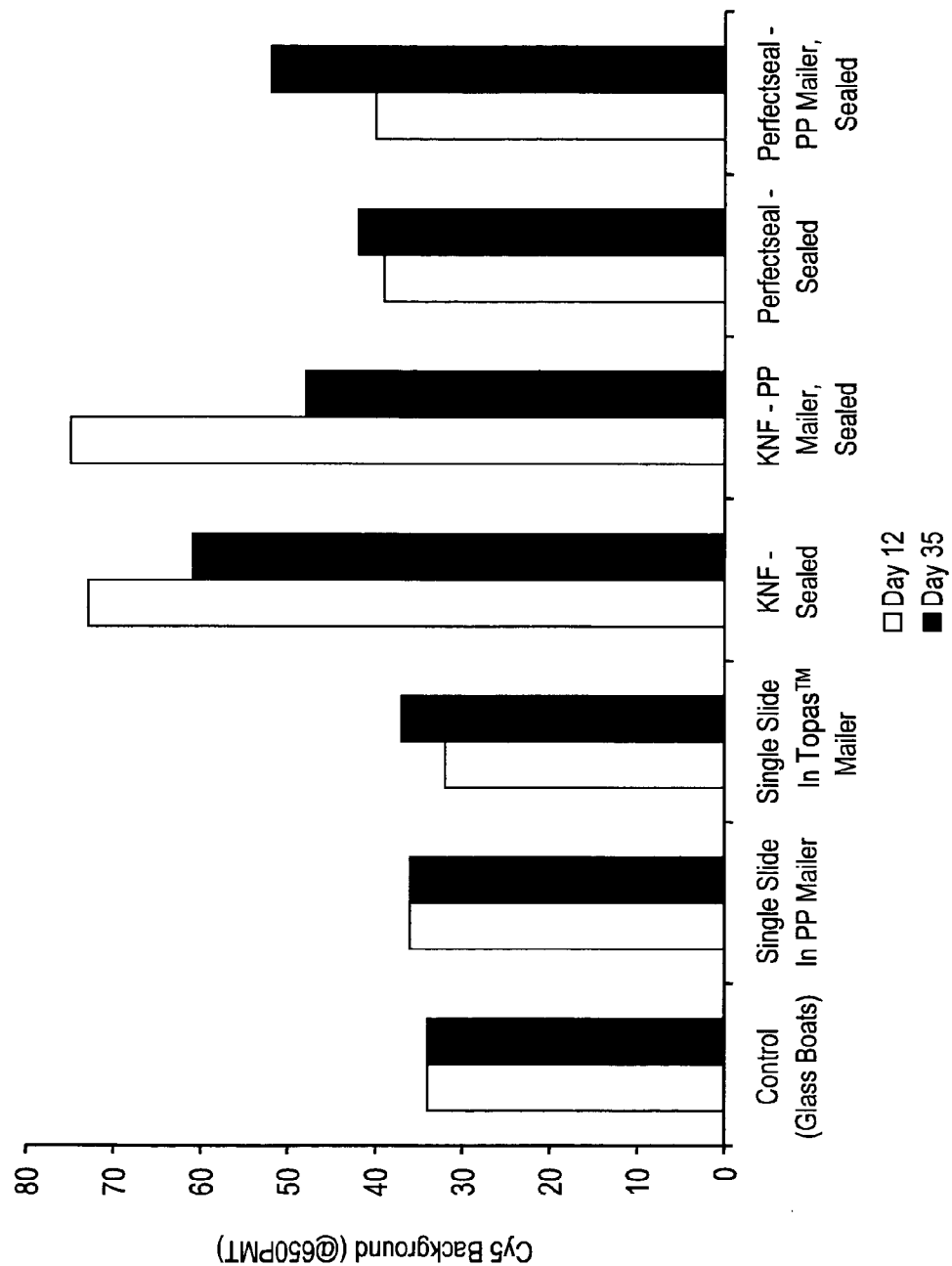
FIG. 6 shows the evolution of the Cy3 background (auto-fluorescence) as a function of storage time in different mailers and pouches

FIG. 6 presents data illustrating the impact that organic contamination has on auto-fluorescence of the coated substrate. The Cy5 background (not shown) does not significantly change for all the packaging conditions tested after 35 days of storage. Although the Cy3 background remains the same for the slides stored in the glass boat, but the background increases for all of the slides that are stored in a pouch, especially for the KNF pouch. From these results, it can be concluded that the pouches used to package mailers alter the surface properties of GAPS slides: higher water contact angle, higher Cy3 background.

Coating of Slides with Surfactant Monolayers

Trials to temporarily protect GAPS coatings with removable monolayers or organic coatings were undertaken. The protective coatings considered were surfactants based on phosphoric acid esters (Walliphos series, Wall Chemie GmbH) and SDS (sodium dodecyl sulfate). Deposition and removal of these anionic compounds must be controllable by the pH conditions. The function of these coatings will be protecting the GAPS layer from pollution and blocking the amine groups at the GAPS layer surface. They have to be easily and totally removable from the surface before using the slide to recover free amine functions and to preserve a good wettability with water.

Although calcium oxide is a demonstrated getter of carbon dioxide, other possibilities to protect or regenerate GAPS-coated slides were explored. One of such alternatives includes temporary protection of the amine layer by coating the slide with anionic surfactant monolayers. This kind of surface treatment, however, are relatively complicated, in that it would have needed to be applied in controlled conditions and required special and extra preparation steps in manufacturing before use. Another possibility is to chemically treat the slide with a basic solution of calcium hydroxide which again requires a special preparation step before using the slides. To date, introducing calcium oxide in the slide packaging in order to avoid the natural carbonatation of slides during storage appears to be the more promising and practical option.

Figure 7:
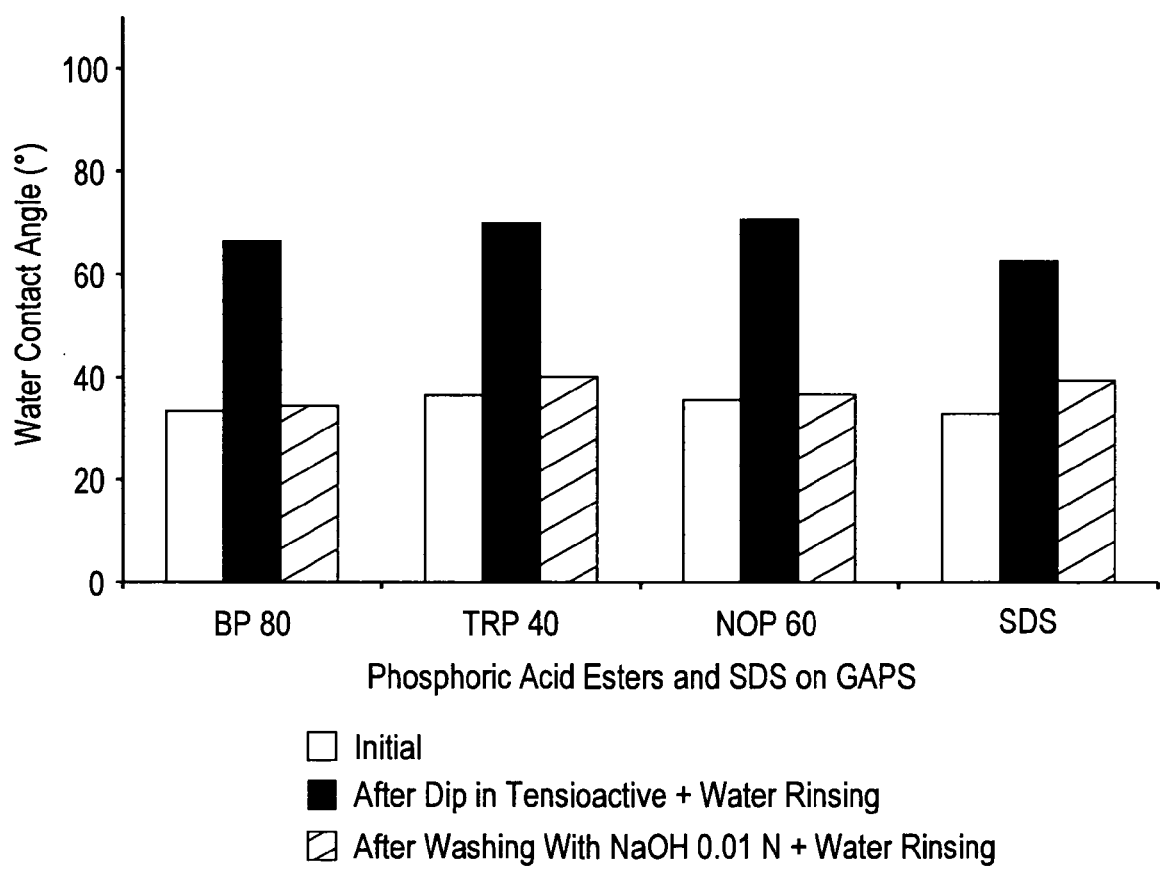
FIG. 7 represents the reversible adsorption of anionic monolayers, in which phosphoric acid ester surfactants (BP 80, TRP 40, NOP 60) and sodium dodecylsulfate (SDS) adsorb in acidic pH and desorb in basic pH. (WALLIPHOS BP 80: Mixture from $C_{12}$–$C_{14}$-Alcoholpolyglycoletherphosphoric acid ester and $i$-$_8$-Alcoholphosphoric acid ester, Na Salt.

The water contact angle before coating with monolayers of surfactants and after removal is presented in FIG. 7. Before coating, GAPS slides have a water contact angle of 30–35°, which increases to 70° after coating with the various monolayers (chemical names are given in FIG. 7). The long hydrophobic tail of surfactants is responsible for the hydrophobic property of the coated substrates. After removal of the anionic surfactant monolayers in basic conditions (pH=12), the initial wettability of slides is recovered ($\theta \approx 35°$).

In another embodiment, the present invention relates a method of providing a virtually $CO_2$-free atmosphere in a package adapted for an amine-coated substrate. The method comprises: a) providing a substrate with an amine-coated surface; b) providing an enclosure; c) providing a chemisorbent material having a composition made from either a single-material or a combination of materials, said material being reactive with $CO_2$ and having a high-surface energy of $\geq 100$ milli-joules/m$^2$ for removing organic compounds from within said enclosure; d) enclosing said substrate and said chemisorbent material within said enclosure; and e) removing $CO_2$ and other contaminant components or vapors from said package.

EXAMPLES

In empirical examples, one can observed that the staining and the hydrophilicity of GAPS-coated slides are maintained when the slides are stored in presence of CaO powder (quick lime activated at 800° C.). Fresh GAPS-coated slides are stored in Evergreen™ polypropylene (PP) mailers, half containing CaO powder, half without CaO powder. Once a month, one slide of each series is taken for wettability, fluorescent background measurements, and gold staining. The results after 1, 2, and 3 months, respectively, of storage are presented in the FIG. 12. The storage with CaO powder has a positive impact in preserving the hydrophilicity of slides and their stainability. The water contact angle (θ/water) does not increase as it usually does during storage in Evergreen PP mailers. After 3 months of storage in Evergreen PP mailers, the water contact angle is equal to 32° and the slides are stainable in presence of CaO. Without CaO, the water contact angle is greater than or equal to 53° and the slides are not stainable any more.

In another example using a closed system like a sealed packaging for GAPS-coated slides, we placed about 0.5 g of CaO, in large excess, to fix carbon dioxide in the atmosphere of the packaging. With about 0.5 g of CaO, one theoretically can eliminate the carbon dioxide from a cubic meter of air.

Although addition of either calcium oxide or some other sorbents of carbon dioxide into a packaging of amine-coated slides may be technically simple, the method conveys great advantage to the present bio-substrate shipping systems at a relatively inexpensive cost. That is, the invention affords commercial advantage by preserving the stability, functionality and performance abilities of the surface chemistry of the slides for long durations than conventionally achievable without such chemisorbent. Further, the wettability of coated slides is preserved over months, as revealed by colloidal gold staining and water contact angle measurements.

For safety or cost-related reasons, the preferred metal oxides to remove carbon dioxide and volatile organic contaminants from glass slides coated with amine functions are calcium oxide, magnesium oxide and zinc oxide.

Some alkaline hydroxides, at least sodium and potassium, are very water soluble that they become deliquescent in (humid) air. Earth alkaline oxides are less soluble and stay as a solid powder when left in open air. This is another reason to prefer earth-alkaline, or zinc oxide (eventually silver oxide).

One consequence of organic contamination on GAPS slides is an increase of the auto-fluorescence of slides, such as shown in FIGS. 12 and 13. Examples of organic compounds having fluorescent properties are derivatives of aromatic or poly-aromatic compounds. The second consequence is an increase of the hydrophobicity of slides changing their wettability and printability. It is often observed that auto-fluorescence and hydrophobicity increase concomitantly. Finally when GAPS slides are used for printing GPCR arrays, the level of non-specific binding of labeled ligands is another source of background in GPCR assays. Calcium oxide, which maintains the required level of hydrophilicity of slides, prevents the increase of (non-specific) binding of labeled ligands with slide storage time.

Example of Prevention of the Carbonatation of GAPS Substrates with CaO

After 6 month of storage, we made measurements on samples of GAPS-coated slides stored with and without CaO in the packaging. The results for the first, third, and sixth month of storage are summarized in FIGS. 14 and 15. FIG. 14 shows the results of wettability with water under several different conditions. For each condition tested, when CaO is in the packaging, the contact angle with water is lower (at least 10 degrees) and remains in the good target for GPCR printing. When there is no CaO, all the contact angles are above 40 degrees, confirming stability of slides in presence of CaO. FIG. 15 shows the relative level of Cy3 fluorescent background on the slides. The fluorescent background remains very low ($\leq 100$ RFU) when CaO is present in the packaging under all of the conditions. When there is no CaO in the packaging, the level of Cy3 signal significantly increases for two of the 3 conditionings tested except when the Topas mailer is wrapped in an aluminum foil. It shows that the aluminum foil may act also as an organic getter, however it is not sufficient to maintain a low water contact angle (see FIG. 14). The level of fluorescent background on Cy5 channel remains very low whatever the conditioning tested. It is believed that other oxides, such as ZnO, can work as well for carbon dioxide and organic component getters. In summary, clean mineral oxide powders, composed of metal oxides cited in the metal oxide data file hereafter, are chemical sorbent of carbon dioxide and have the capacity of adsorbing organic contaminants present in, or released by, the packaging.

The present invention has been described both in general and in detail by way of examples. Persons skilled in the art will understand that the invention is not limited necessarily to the specific embodiments disclosed. Modifications and variations may be made without departing from the scope of the invention as defined by the following claims or their equivalents, including equivalent components presently known, or to be developed, which may be used within the scope of the present invention. Hence, unless changes otherwise depart from the scope of the invention, the changes should be construed as being included herein.

Any discussion of the background to the invention herein is included to explain the context of the invention. Where any document or information is referred to as "known", it is admitted only that it was known to at least one member of the public somewhere prior to the date of this application. Unless the content of the reference otherwise clearly indicates, no admission is made that such knowledge was available to the public or to experts in the art to which the invention relates in any particular country (whether a member-state of the PCT or not), nor that it was known or disclosed before the invention was made or prior to any claimed date. Further, no admission is made that any document or information forms part of the common general knowledge of the art either on a world-wide basis or in any country and it is not believed that any of it does so.

The invention claimed is:

1. A method of protecting an amine-coated substrate surface, the method comprising: providing an amine-coated substrate; providing a container for housing said amine-coated substrate; providing a sorbent, having a composition made from either a single material or a combination of materials, said material characterized as being reactive with $CO_2$ and having a high-surface energy of $\geq 100$ milli-joules/$m^2$ for removing organic compounds from within said container; and exposing said amine-coated substrate and an atmosphere within said container to said sorbent.

2. The method according to claim 1, further comprising: maintaining a water contact angle $\leq 40$ degrees relative to the substrate surface to preserve hydrophilicity of said substrate surface.

3. The method according to claim 2, further comprising: maintaining a water contact angle $\leq 35$ degrees relative to the substrate surface to preserve hydrophilicity of said substrate surface.

4. The method according to claim 1, wherein said amine-coated substrate exhibits a stable and low auto-fluorescence of $\leq 150$ RFU in Cy5 wavelength channel at about 600–750 PMT over a time period of least 3 months.

5. The method according to claim 1, wherein said sorbent has a high-surface energy of $\geq 50$ milli-joules/$m^2$ to absorb volatile organic compounds.

6. The method according to claim 1, wherein said sorbent material includes any one and a combination of: CaO, MgO, or ZnO.

7. A method of removing $CO_2$ or organic contaminants from a package containing an amine-coated substrate, the method comprises: providing a carbonated substrate and either a sorbent material that is reactive with $CO_2$ and having a high-surface energy of $\geq 100$ milli-joules/$m^2$ for removing organic compounds, or a solution of either calcium, magnesium, or zinc hydroxide, ($Ca(OH)_2$, $Mg(OH)_2$, $Zn(OH)_2$), with a pH value $\geq 8$, or a combination of said hydroxides; exposing a surface of said carbonated substrate to either said sorbent material or said hydroxide solution, or both, wherein either said solid sorbent or said solution of either $Ca(OH)_2$, $Mg(OH)_2$, or $Zn(OH)_2$, or said combination regenerates free amine functionality on said surface.

8. The method according to claim 7, wherein said carbonated substrate surface is exposed to said solution of either $Ca(OH)_2$, $Mg(OH)_2$, or $Zn(OH)_2$, or said combination for a period of within one hour.

9. The method according to claim 7, wherein said substrate surface is exposed to said solution for a period of under about forty (40) minutes.

10. The method according to claim 7, wherein said substrate surface is exposed to said solution for a period of not less than about ten (10) minutes.

11. The method according to claim 7, wherein said solution of hydroxide displaces a carbamic or carbonic acid group.

12. The method according to claim 7, wherein said carbonated substrate is dipped in said hydroxide solution.

13. The method according to claim 7, wherein said method regenerates on said substrate surface a water contact angle $\theta$ of about 50° or less.

14. The method according to claim 7, wherein said solution has a pH value of at least 10.

15. The method according to claim 14, wherein said solution has a pH value of about 11–14.

16. A method of providing a virtually $CO_2$-free atmosphere in a package adapted for an amine-coated substrate, the method comprises:
  a) providing a substrate with an amine-coated surface;
  b) providing an enclosure;
  c) providing a chemisorbent material having a composition made from either a single-material or a combination of materials, said material being reactive with $CO_2$ and having a high-surface energy of $\geq 100$ milli-joules/$m^2$ for removing organic compounds from within said enclosure;
  d) enclosing said substrate and said chemisorbent material within said enclosure; and
  e) removing $CO_2$ and other contaminant components or vapors from said package.

17. The method according to claim 16, wherein said chemisorbent material includes any one and a combination of: CaO, MgO, or ZnO.

18. The method according to claim 16, wherein said chemisorbent material is placed within either a filter bag or a kind of receptacle that permits air to flow through.

* * * * *